United States Patent [19]

Ohshita

[11] Patent Number: 5,638,463

[45] Date of Patent: Jun. 10, 1997

[54] IMAGE-DATA PROCESSING SYSTEM

[75] Inventor: Masakazu Ohshita, Kawasaki, Japan

[73] Assignee: Ricoh Company, Ltd., Tokyo, Japan

[21] Appl. No.: 496,687

[22] Filed: Jun. 29, 1995

[30] Foreign Application Priority Data

Jun. 30, 1994 [JP] Japan .................................. 6-150260

[51] Int. Cl.$^6$ ...................................................... G06K 9/46
[52] U.S. Cl. .......................... 382/195; 382/199; 382/266; 358/447; 358/453; 358/459; 395/109
[58] Field of Search ............................ 358/447, 448, 358/456, 459, 534, 523, 525, 453; 395/112, 109, 128, 117; 382/269, 266, 267, 256, 195, 199

[56] References Cited

U.S. PATENT DOCUMENTS

| | | | |
|---|---|---|---|
| 4,544,922 | 10/1985 | Watanabe et al. | 345/27 |
| 5,130,821 | 7/1992 | Ng | 358/459 |
| 5,229,867 | 7/1993 | Ershov et al. | 358/459 |
| 5,270,827 | 12/1993 | Kobayashi et al. | 358/459 |
| 5,270,836 | 12/1993 | Kang | 358/459 |
| 5,327,260 | 7/1994 | Shimomae et al. | 358/488 |
| 5,440,407 | 8/1995 | Overton | 358/443 |

FOREIGN PATENT DOCUMENTS

| | | |
|---|---|---|
| 5-207282 | 8/1983 | Japan . |
| 2-112966 | 4/1990 | Japan . |

*Primary Examiner*—Edward L. Coles, Sr.
*Assistant Examiner*—Fan Lee
*Attorney, Agent, or Firm*—Oblon, Spivak, McClelland, Maier & Neustadt, P.C.

[57] ABSTRACT

A bit-map unit forms a bit map using given image data. A boundary recognizing unit recognizes characteristics of a boundary present between a first type of pixels and a second type of pixels constituting the bit map. A determining unit determines for each pixel whether a correction is necessary so as to make an image produced from the given image data significantly finer. The determination uses at least part of the boundary characteristics. A correction unit performs a correction on image data for each pixel needing the correction. The correction is performed in a manner determined depending on the relevant boundary characteristics. A data replicating unit replicates the given image data to produce copies of the image data in addition to an original of the given image data, the correction unit performing the correction in different manners between the original and copies of the given image data. An image-region setting unit sets a plurality of image regions in the bit map, the correction unit performing the correction in different manners between different image regions of the plurality of image regions.

7 Claims, 25 Drawing Sheets

FIG. 13

| METHOD | TABLE MEMORY CAPACITY(A) | PATTERN MEMORY CAPACITY(B) | TOTAL CAPACITY(A+B) |
|---|---|---|---|
| PREVIOUS APPLICATION | 0 bit | 40960 bits | 40960 bits |
| FIG.10 | 0 bit | 6553360 bits | 6553360 bits |
| FIG.11 | 458752 bits | 1280 bits | 460032 bits |
| FIG.12 | 28672 bits | 20480 bits | 49152 bits |

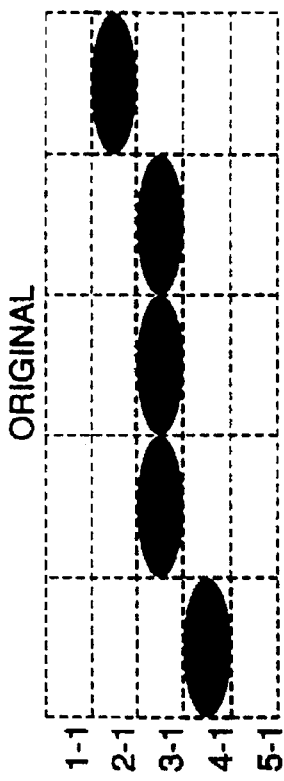
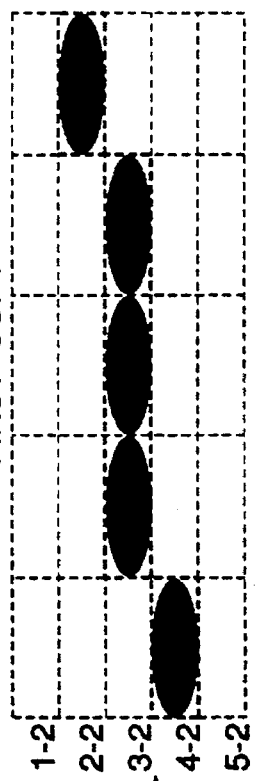
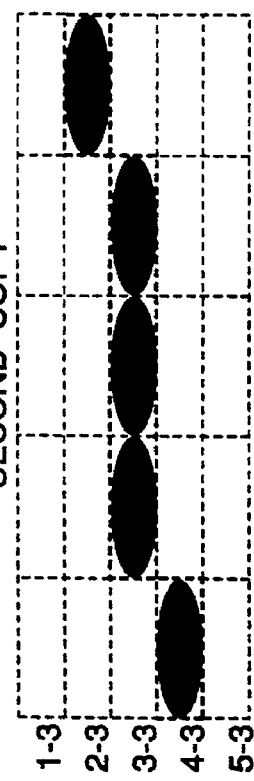
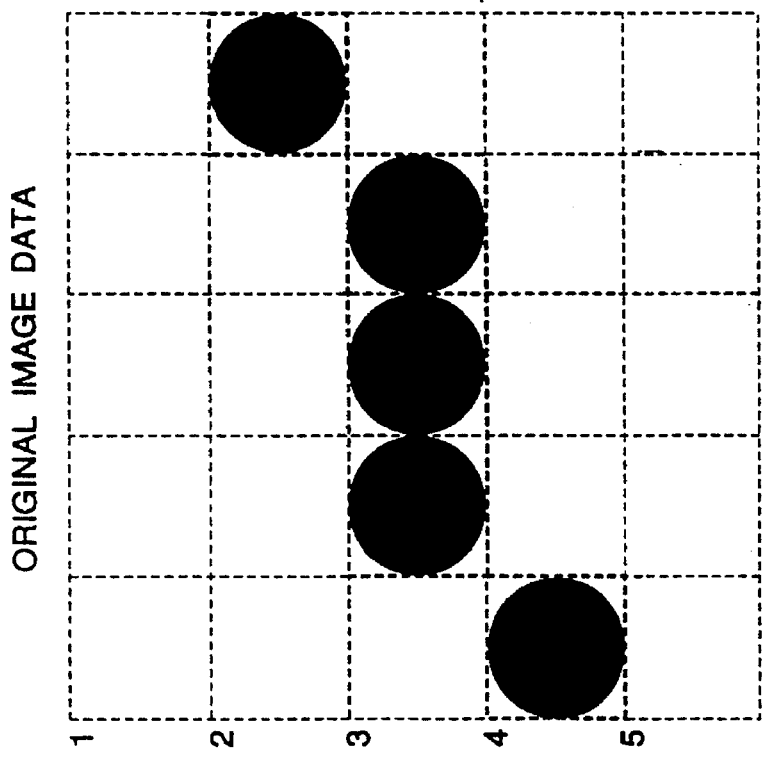

NO DOT CORRECTION DONE CASE

DOT CORRECTION DONE CASE

ORIGINAL IMAGE DATA

NO DOT CORRECTION DONE CASE

DOT CORRECTION DONE CASE

FIG. 32A

| SIGNAL | FIG. 25 | FIG. 26 |
|---|---|---|
| H/V | 1 | 0 |
| DIRI / DIRO | 0 / 1 | 1 / 0 |
| B/W | 0 | 1 |
| U/L | 0 | – |
| GST | 1 | 1 |
| RUC | 1 | 1 |
| LLC | 0 | 0 |
| CCI / CCO | 1 / 0 (2) | 1 / 0 (2) |
| RUASI / RUASO | 0 / 0 | 1 / 0 |
| LLASI / LLASO | – / – | – / – |

FIG. 32B

| SIGNAL | FIG. 25 | FIG. 26 |
|---|---|---|
| RUCN2 / RUCN1 / RUCN0 | 0 / 1 / 1 (3) | 0 / 0 / 1 (1) |
| RUDIR1 / RUDIR0 | 0 / 1 | 1 / 0 |
| LLCN2 / LLCN1 / LLCN0 | – / – / – | – / – / – |
| LLDIR1 / LLDIR0 | – / – | – / – |

FIG. 32C

| SIGNAL | FIG. 25 | FIG. 26 |
|---|---|---|
| G3 / G2 / G1 / G0 | 0 / 1 / 0 / 1 (5) | 0 / 0 / 1 / 1 (3) |
| NO_MATCH | 0 | 0 |

FIG. 32D

| SIGNAL | FIG. 25 | FIG. 26 |
|---|---|---|
| P3 / P2 / P1 / P0 | 0 / 0 / 0 / 1 (1) | 0 / 0 / 0 / 1 (1) |

IMAGE-DATA PROCESSING SYSTEM

BACKGROUND OF THE INVENTION

1. Field of the Invention

The present invention relates to an image-data processing system which may be used in an image forming apparatus. The system includes an electrophotographic system processing digital image data, such as an optical printer, a laser printer, a digital duplicator, a page-printing facsimile device, or an image display device. The present invention in particular relates to image fineness improvement in such an apparatus or system.

2. Related Art

An image forming device and an image display device quantize text image data or picture image data so that relevant data is expanded into a dot-matrix bit-map formation using two-tone data. The text image data is obtained by converting text code data using font data. The picture image data is read in using an image scanner or the like. The bit-map formation of the relevant data is stored in a video memory area in a RAM (random access memory) and is then read out sequentially to be supplied as video data to an image forming unit (engine) or to an image display unit. The image forming unit forms a corresponding image on a recording medium such as a sheet of paper or the like and the image display unit displays the corresponding image on a screen.

An ideal image is an analog image an outline of which may extend in a plurality of arbitrary directions. However, a bit-map image obtained as a result of quantization is a digital image an outline of which may extend only in two predetermined perpendicular dimensions of the dot matrix. Thus, an outline of a digital image representing an analog image having an outline extending obliquely or a curved manner can only extend stepwise along dot-matrix ruled lines (such a phenomenon may be referred to as 'jag') generally obliquely or generally in a curved manner. This property of the digital image may degrade fineness of the final image, thereby disabling precise representation of an original image or a desired outline.

Reduction in dot (pixel) size of the dot matrix, thereby increasing a number of dots present in a unit area (increasing a dot-matrix resolution), may reduce such image degradation. However, such resolution increase significantly raises the cost. For example, changing from a 300 dpi×300 dpi two-dimension bitmap to a 600 dpi×600 dpi one requires 4 times the memory capacity and 4 times the processing speed.

Other methods for reducing image degradation include an interpolation technology which is used to produce a line connecting consecutive corners present on a stepwise outline so as to form a slope therebetween. The interpolation technology can also be used to smooth brightness between adjacent outline dots so as to make an edge unclear. Such methods are effective to smooth jags on an outline but may degrade contrasts and/or resolution since fine shapes are made unclear.

In order to solve such a problem, a technology has been developed as disclosed in the U.S. Pat. No. 4,544,922. In this technology, a dot having a size smaller than an ordinary size is added or a partial area having the above smaller dot size is removed from an appropriate part of a dot pattern represented by a bit map so as to correct the relevant part. A pattern recognition technology or a template comparison technology is used to detect a part to be corrected in the dot pattern. The above disclosed technology performs the pattern recognition process or the template comparison process on all positions of a bit-map image and performs dot correction such as described above appropriately. As a result, although it is possible to improve image quality (image fineness) by smoothing a line shape without degrading contrasts, the relevant processing system is extremely costly and time-consuming.

In order to solve the problem, a method is proposed in Japanese Laid-Open Patent Application No.2-112966. In this method, a relevant bit-map image is compared with a previously stored predetermined template for each small fragment of an images. Then, if matching in characteristics is detected between the bit-map image and a template for an image fragment, the fragment of the bit-map image is corrected by correction dots. Thus, the image quality of a printed image is improved.

In order to realize the above method, a template matching process described below may be performed. Data of a bit map is converted into serial data so as to be input to a FIFO (first-in first-out) buffer. Then, a subset of a bit-map image of N×M bits is formed. A sample window is used to observe or extract therethrough data from the subset of the bit-map images. The sample window has a predetermined shape, a predetermined number of bits and a central bit corresponding to that of the subset image. Then, the thus observed or extracted data is used to detect matching with templates having various characteristic patterns which patterns are ones of images to be corrected.

If any template matches the observed or extracted data, a certain correction sample (correction dot) is used to replace the central bit in the relevant subset image. The correction sample corresponds to the relevant template. If no template matches the observed or extracted data, the relevant central bit is left unchanged.

Such template matching processes are performed by sequentially shifting the subset image to be processed so that all the area of the relevant bit-map image is processed. The processes are performed so that each bit of the bit-map image is assigned to be the above central bit sequentially. Thus, in comparison with the above technology disclosed in the U.S. Pat., a fine final image may be obtained by improving the image quality even with a relatively small memory capacity and with a relatively inferior data processing capability.

However, even in the above method, a great number of templates corresponding to all the characteristic patterns of images in the above sample-window formation are necessary. Producing the great number of templates requires considerable manpower and thus is costly. In addition, a considerable capacity of memory is required to store the templates. Further, the above-described template matching processes are time-consuming.

In order to solve the problems, the present applicant proposed a new image-data processing method and its device such as that disclosed in Japanese Laid-Open Patent Application No.5-207282.

The above method can eliminate jags such as described above so as to improve a resulting image quality using input image data in a bit-map formation. The method can reduce an amount of data stored in a memory, which data will be used to perform an appropriate correction process on the bit-map image. The method determines which dots in the input image data are to be corrected and which type of correction is required. The method carries out the above determination by means of simple logical operations in an extremely short time period using a microprocessor.

This method will now be briefly described. Characteristics of a line shape of a boundary between a black-dot region and a white-dot region in the bit map of input image data are recognized. As a result, the characteristics are then converted into a multi-bit code for each dot of the input image data. Then, at least a part of the code is used to determine whether or not the relevant dot is one to be corrected. Then, if the dot is determined to require correction, it is corrected in accordance with the relevant code. The above determination uses a pattern memory having addresses corresponding to the codes, wherein the appropriate correction may be determined according to the addresses.

Each multi-bit code includes a code indicating the slope (gradient) direction of the line at the position of the relevant dot, a code indicating the gradient of the slope, and a code indicating the position of the relevant dot. The above position is one, the origin of which is an initial dot in a series of dots straightly arranged vertically or horizontally and including the relevant dot.

In the above method, it is not necessary to provide and store as templates all characteristic patterns corresponding to ones to be corrected. Dots to be corrected and the correction required can be determined simply and within a short time period using the easily produced codes described above.

Further, dot data of dots present in an area, the center of which is the relevant dot, is extracted through an appropriate window. The area is separated into a core area located at the center and a plurality of peripheral areas located around the core area. The above code is produced based on recognition information obtained as a result of recognizing the line shape as mentioned above. The recognition information to be used to produce the code is a combination of core-area recognition information and peripheral-area recognition information. The core-area recognition information is obtained using the core area of the image data and the peripheral-area recognition information is obtained using at least one peripheral area of the image data. The at least one peripheral area is determined using the core area of the image data. Thus, it is possible to reduce the amount of information to be used in the production of the above codes so that the code production can be carried out efficiently.

SUMMARY OF THE INVENTION

An object of the present invention is to provide an image-data processing system and method which are an improvement of the above-described system and method. The improvement increases the resolution (quality) of resulting images. Also, the improvement further reduces the amount of data required to be stored in a memory, which data will be used for the above image quality increase. The improvement also enables the relevant system to be used in various environments. In addition, the above improvement improves efficiency of image-data manipulation.

An image-data processing system according to the present invention comprises:

bit-map means for forming a bit map using given image data;

boundary recognizing means for recognizing characteristics of a boundary present between a first type of pixels and a second type of pixels constituting said bit map;

determining means for determining for each pixel whether a correction is necessary so as to significantly make an image produced from the given image data finer, the determination using at least part of the boundary characteristics;

correction means for performing a correction on image data for a pixel, the correction of said pixel having been determined to be necessary, said correction being performed in a manner determined depending on the relevant boundary characteristics; and image-region setting means for setting a plurality of image regions in said bit map, said correction means performing the correction in different manners between different image regions of said plurality of image regions.

In the system, by setting a plurality of image regions in the bit map, it is possible to perform the correction in different manners between different image regions of said plurality of image regions. Therefore, an image having various correction patterns can be automatically obtained.

Further, it is preferable that data replicating means is further provided for replicating the given image data to produce copies of said image data in addition to an original of said given image data, said correction means performing the correction in different manners between said original and copies of said given image data. By producing copies of the image data in addition to an original of the given image data, a data amount is multiplied. As a result, it is possible to perform the correction in different manners between the original and copies of the given image data. Therefore, by integrating the original and copies of the image data, fine image correction (jag elimination) can be easily achieved.

Further, it is preferable that:

said correction means uses a pattern memory previously storing therein a plurality of predetermined correction patterns to be used in the correction, said pattern memory being formed so that an appropriate manner of correction may be selected from among a plurality of predetermined manners of correction depending on three conditions, a first condition corresponding to which pattern said relevant boundary characteristics have, a second condition corresponding to which one of said original and copies of said given image data is relevant, and a third condition corresponding to which one of said plurality of image regions is relevant.

Further, it is preferable that:

said pattern memory includes a first memory and a second memory, said second memory previously storing therein said plurality of predetermined correction patterns, said second memory being formed so that a pattern may be selected from said plurality of predetermined correction patterns using a code selected from codes previously stored in said first memory, said first memory previously storing said codes therein, said first memory being formed so that the appropriate code may be selected from said codes depending on said three conditions.

Instead, it is also preferable that:

said pattern memory includes a first memory and a second memory, said second memory previously storing therein said plurality of predetermined correction patterns, said second memory being formed so that a pattern may be selected from said plurality of predetermined correction patterns using a code selected from codes previously stored in said first memory and codes indicating and said second and third conditions, said first memory previously storing said codes therein, said first memory being formed so that the appropriate code may be selected from said codes depending on the various patterns of the boundary characteristics.

As a result, it is possible to effectively reduce a total memory capacity without degrading correction performance of the correction means.

Further, it is preferable that changing means is provided for changing a manner in which it is determined which one of said different manners of the correction performed by said correction means is performed on each one of said original and copies of said given image data. As a result, the correction manner of the correction means can be easily changed. Thus, it is possible to substantially increase the correction patterns which may be used by the correction means.

Further, it is preferable to further provide:

clock generating means, inside said system, for generating internal clock pulses, and selecting means for selecting clock pulses, in synchronization with which pulses each means operates, from between said internal clock pulses and external clock pulses which may be supplied outside said system.

As a result, the system can be used in various environments.

Other objects and further features of the present invention will become more apparent from the following detailed description when read in conjunction with the accompanying drawings.

BRIEF DESCRIPTION OF THE DRAWINGS

FIG. 13 shows a comparison of memory capacities required for the respective memory blocks shown in FIGS. 10, 11 and 12, and a memory capacity required for a pattern memory disclosed in a previous application, Japanese Laid-Open Patent Application No.5-207282;

FIGS. 15A, 15B, 15C and 15D illustrate an original set of dots in bit-map formation image data and three sets of dots resulting from twice replicating the original set of dots;

FIGS. 32A, 32B, 32C and 32D show data obtained as a result of recognizing patterns of relevant dots (the central dots in the core areas 73C) for the FIGS. 25 and 26 cases by means of a pattern recognizing unit 74 shown in FIG. 4.

DESCRIPTION OF THE PREFERRED EMBODIMENTS

Figure 1:
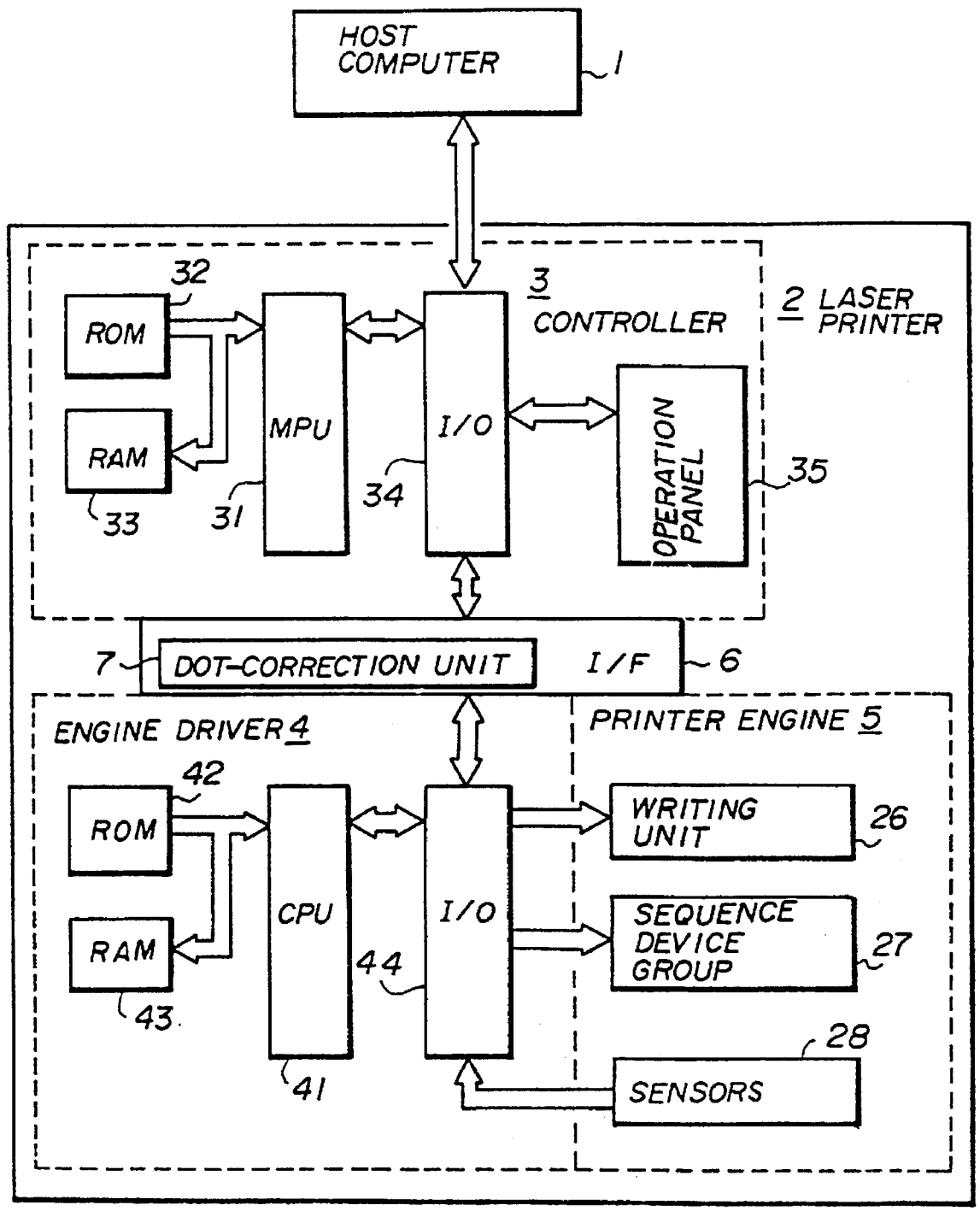
FIG. 1 shows an outline block diagram of a control system in a laser printer in an embodiment of the present invention together with a host computer.

A laser printer in an embodiment of an image-data processing system and method according to the present invention will now be described with reference to FIG. 1.

The laser printer 2 includes a controller 3, an engine driver 4, a printer engine 5 and an internal interface 6.

The laser printer 2 receives printing data from a host computer 1 and the controller 3 converts the printing data into bit-map data for each page. The controller 3 then converts the bit-map data into video data, consisting of dot information, which drives a laser The controller 3 sends the video data to the engine driver 4 via the internal interface 6 so that the printer engine 5 is driven by the engine driver 4. Then, the printer engine 5 forms the relevant visible image on a sheet.

A dot-correction unit 7 is provided in the internal interface 6. The unit 7 uses the image data processing system and method according to the present invention. The unit 7 performs a dot correction of the above video data supplied by the controller 3. Thus, the image quality is improved in the printed visible image.

The controller 3 includes a main microcomputer (which will be referred to as MPU hereinafter) 31 and a ROM 32. The ROM 32 has stored therein programs used by the MPU 31, constant data, text-font data and so forth. The controller 3 further includes a RAM 33 for storing temporary data, dot-pattern data and so forth therein; an I/O 34 for controlling data input/output; and an operation panel 35 which is connected to the MPU 31 via the I/O 34. The above components are connected with one another by means of data buses, address buses, control buses and so forth.

The host computer (machine) 1 and the internal interface 6 including the dot-correction unit 7 are connected to the MPU 31 via the I/O 34.

The engine driver 4 includes a sub-microcomputer (which will be referred to as a CPU hereinafter) 41 and a ROM 42. The ROM 42 has stored therein programs used by the MPU 41, constant data and so forth. The engine driver 4 further includes a RAM 43 for storing temporary data therein and an I/O 44 for controlling data input/output. The above components are connected with one another by means of data buses, address buses, control buses and so forth.

The I/O 44 connected to the internal interface 6 inputs the video data from the controller 3 and also inputs the states of various kinds of switches provided on the operation panel 35. The I/O 44 outputs an image clock signal (WCLK) and status signals such as a paper-ending signal to the controller 3.

Further, the I/O 44 is also connected to a writing unit 26, a sequence device group 27 and various kinds of sensors 28 including a synchronous sensor which will be described later. These components are included in the printer engine 5.

The controller 3 receives commands such as printing instructions and the printing data such as text data, graphical-image data and so forth from the host computer 1. The controller 3 edits the thus-received printing data and then obtains the corresponding dot patterns if the printing data includes the text data. Such dot patterns may be obtained as the text fonts stored in the ROM 32 and will be used to print out the corresponding texts. The controller 3 forms the corresponding bit-map data consisting of texts and graphical images (two of which will be simply referred to as images hereinafter). The controller 3 then stores the bit-map data into a video-RAM area in the RAM 33, in a bit-map formation for each page.

When the controller 3 receives a ready signal and image clock signal WCLK supplied by the engine driver 4, the controller 3 outputs the bit-map data (dot pattern data) stored in the above video-RAM area in the RAM 33 as mentioned above. The thus-output data acts as the video data and is supplied to the engine driver 4 via the internal interface 6 in synchronization with the clock pulses of the image clock signal WCLK. The video data is data which will undergo a dot-correction operation, which will be described later, by means of the dot-correction unit 7 in the internal interface 6.

The operation panel 35 has various switches and indicators which are not shown in the figure. An operator uses such switches for specifying various instructions and data to the laser printer 2. The operation panel 35 then transfers the thus-obtained information to the engine driver 4 and displays various states in the printer 2 through the indicators.

The engine driver 4 uses the video data supplied by the controller 3 via the interface 6 to control the writing unit 26, the sequence device group 27 and so forth. The sequence device group 27 includes an electrifying charger and a developing unit. The engine driver 4 inputs the video data via the internal interface 6 and outputs the video data to the writing unit 26. The engine driver 4 further inputs thereto signals, indicating states of various parts in the engine, from the various kinds of sensors 28. The engine driver 4 suitably processes the thus-input signals. The engine driver 4 outputs the status signals. The state signals include an error-state signal such as the paper-ending signal.

Figure 2:
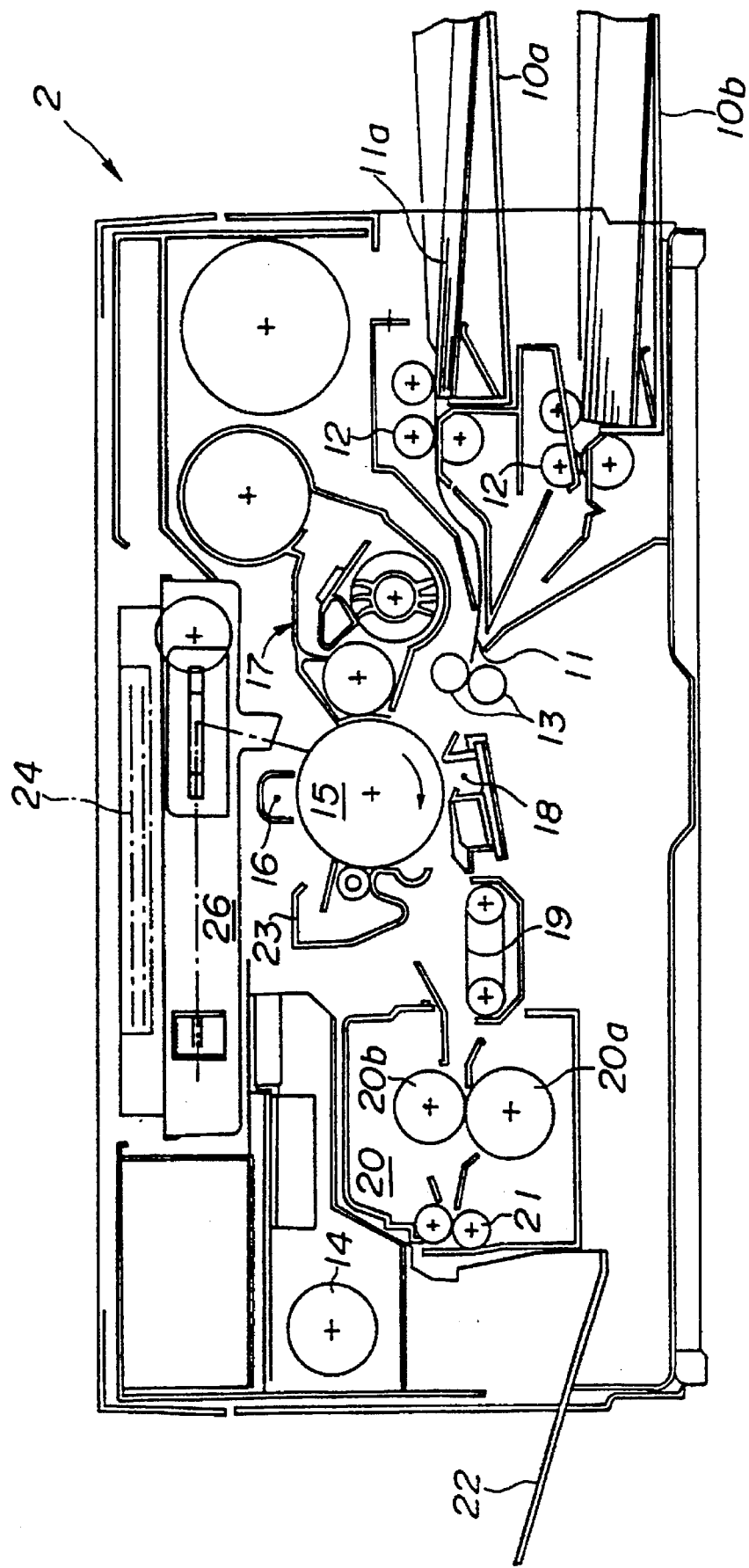
FIG. 2 shows an outline elevational sectional view of a mechanical outline construction of the above laser printer.

With reference to FIG. 2, a mechanical construction of the printer engine 5 in the laser printer 2 will now be described.

The laser printer 2 supplies sheets of paper 11 from either top or bottom paper-supply cassettes 10a or 10b. A sheet 11 is assumed to be supplied from the sheet stack 11a of the top paper-supply cassette 10a via, for example, a paper-supply roller 12. The sheet 11 is carried to an image transfer position on a photosensitive drum 15 as a result of a movement timing of the sheet 11 being controlled by a registration roller pair 13.

A main motor 14 rotates the photosensitive drum 15 in a direction indicated by an arrow in the figure. The surface of the drum 15 is electrified by means of an electrifying charger 16 and then an electrostatic latent image is formed on the surface of the drum 15 as a result of a spotlight being appropriately scanned on the surface of the drum 15. The above spotlight is supplied by the writing unit 26 and is PW-modulated.

The electrostatic latent image formed on the surface of the drum 15 is converted into a visible image as a result of toner being adhered on the surface appropriately. The thus-formed visible toner image is transferred onto the above sheet 11 by the effect of a transfer charger 18. Then, the sheet 11, on which the toner image has been transferred, is removed from the drum 15 and conveyed to a fixing unit 20 by means of a carrying belt 19. Then, a pressing roller 20a in the unit 20 presses the sheet 11 onto a fixing roller 20b in the unit 20. Then, the pressure and the temperature of the fixing roller 20b fix the toner image present on the sheet 11 onto the sheet 11.

The sheet 11 is then ejected from the unit 20 and then conveyed, by means of a ejecting roller 21, to an ejecting tray 22 provided at a side of the printer 2.

The toner left unused on the surface of the drum 15 is removed by a cleaning unit 23 and then collected.

The laser printer 2 has a plurality of printed circuit boards 24 at the top part in the printer 2 as shown in FIG. 2. The printed circuit boards 24 embody the above-described controller 3, engine driver 4 and internal interface 6.

Figure 3:
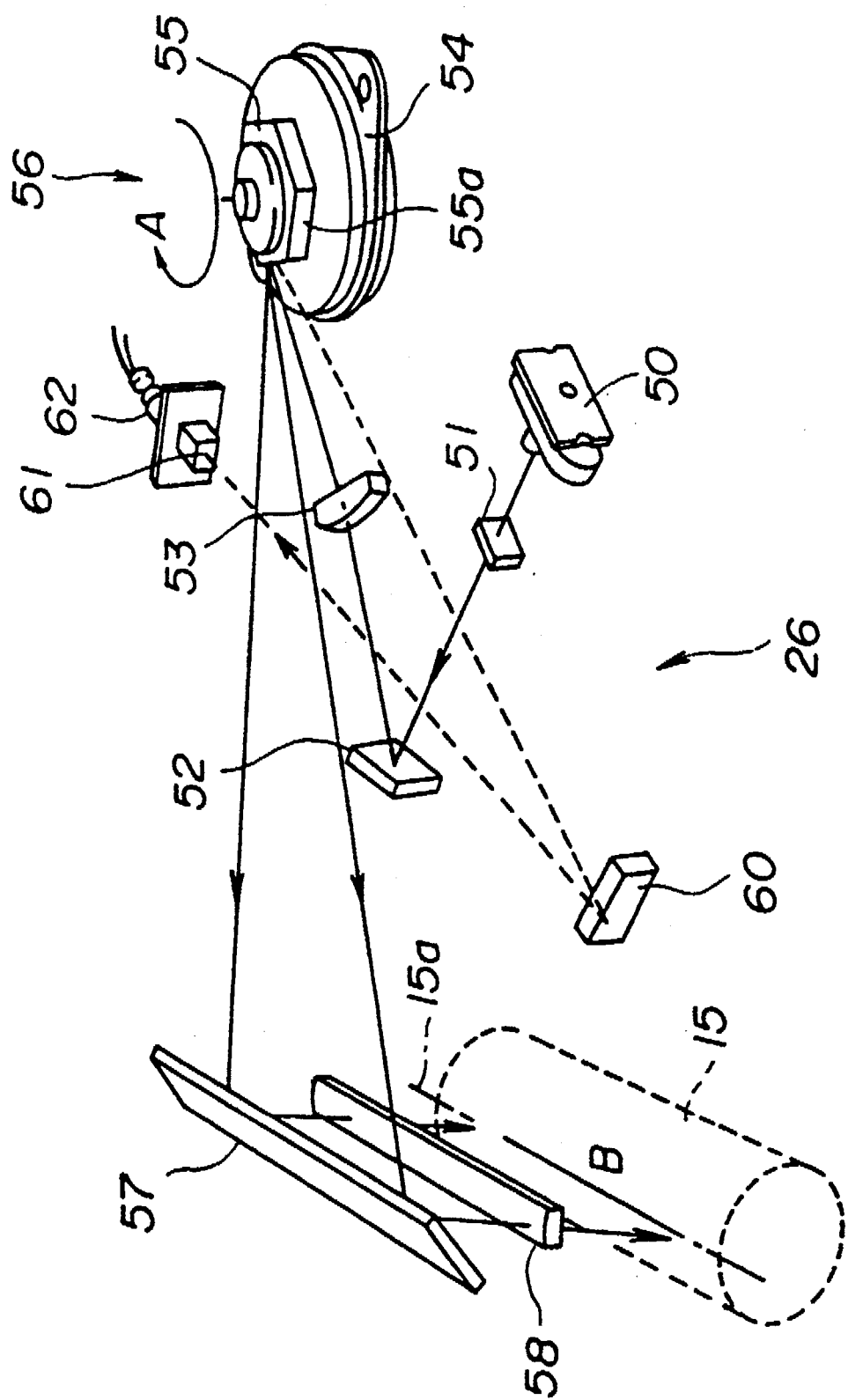
FIG. 3 shows a perspective view of an embodiment of essential components of an optical system of a writing unit 26 in the construction shown in FIG. 2.

With reference to FIG. 3, an embodiment of the writing unit 26 will now be described.

The unit 26 includes a laser diode unit (which will be referred to as a LD unit) 50, a first cylinder lens 51, a first mirror 52, an image formation lens 53, a rotational polarizer 56 including a disc-shaped motor 54 and a polygon mirror 55 rotated by the motor 54 in an A direction indicated in the figure, a second mirror 57, a second cylinder lens 58, a third mirror 60, a light-converging lens 61 of a cylinder lens and a synchronous sensor 62 of a photosensitive element. The above LD unit 50 has a laser diode (which will be abbreviated as the LD) and a collimator lens integrated inside the unit 50. The collimator lens changes a divergent beam emitted by the LD into a parallel beam.

The first cylinder lens 51 changes the form, in the sub-scan direction on the surface of the drum 15, of the parallel beam supplied by the LD unit 50. The image-forming lens 53 changes a parallel beam reflected by the first mirror 52 into a convergence beam. The beam emitted by the image-forming lens 53 is incident on one of mirror surfaces 55a of the polygon mirror 55.

Each the mirror surfaces 55a of the polygon mirror 55 has a curved shape so that the polygon mirror 55 is an R polygon mirror. Thus, it is possible to eliminate a fΘ lens which would conventionally have been disposed between the polygon mirror 55 and the second mirror 57. The rotational polarizer 56 is one of a post object type in which a light beam is incident on a polarizer after being converted into a converging beam.

The second mirror 57 reflects the beam which has been reflected and polarized by the rotational polarizer 56. The thus-reflected beam is a scan beam and is incident on the photosensitive drum 15 via the second cylinder lens 58. The scan beam converges to form a focused spot on the surface of the drum 15 on a main scan line 15a.

The third mirror 60 is disposed at a position outside a zone on the drum 15, within which zone the scan beam scans. The third mirror 60 reflects incident light to the synchronous sensor 62. The beam reflected by the third mirror 60 is then converged by the convergence lens 61 so that the resulting beam is received by the synchronous sensor 62. The sensor 62, including a photosensitive element such as a photodiode, receives the above beam and converts it into a synchronous signal to be used to fix the scan starting position.

Figure 4:
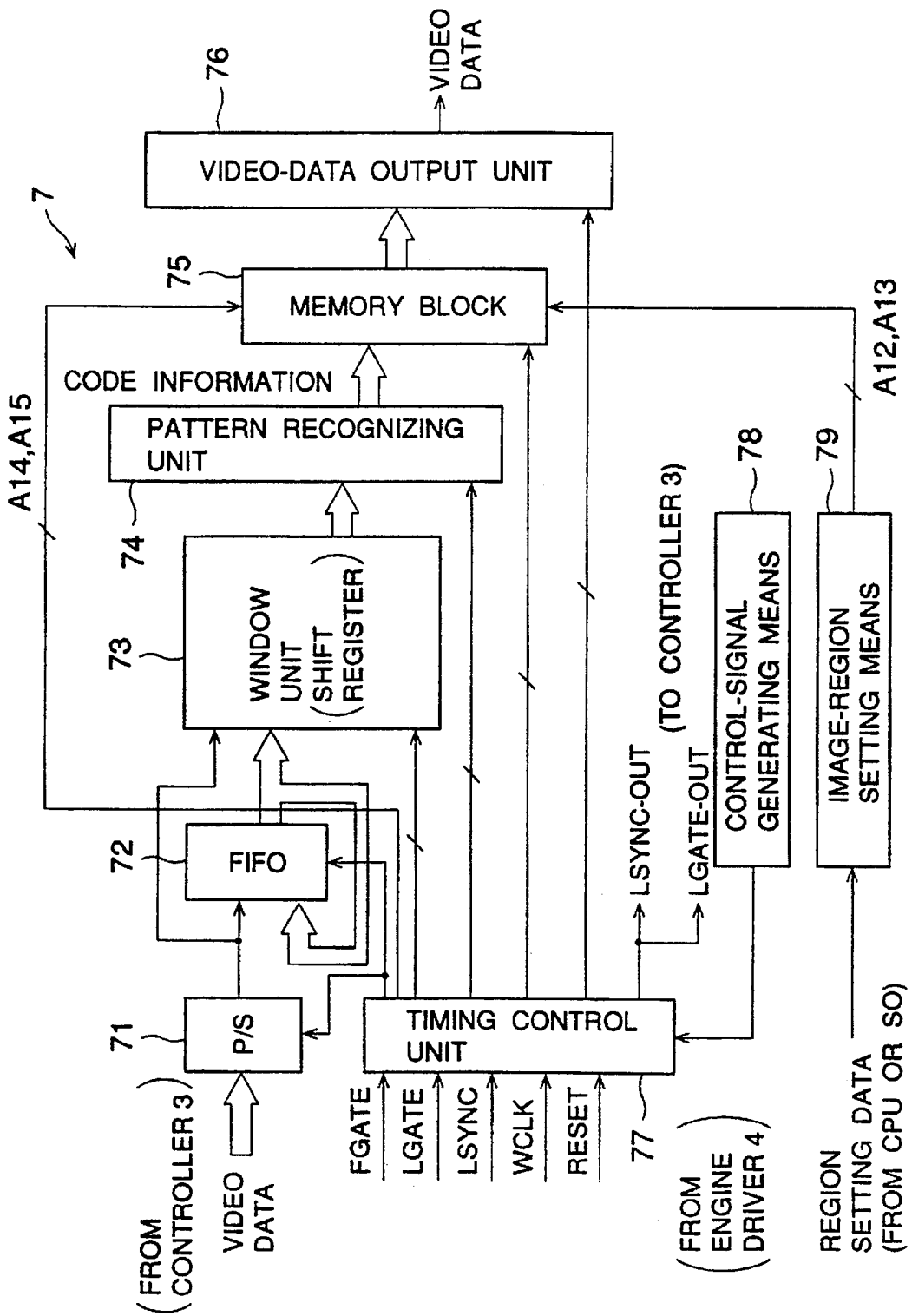
FIG. 4 shows a block diagram of an embodiment of a dot-correction unit in the construction shown in FIG. 1.
Figure 5:
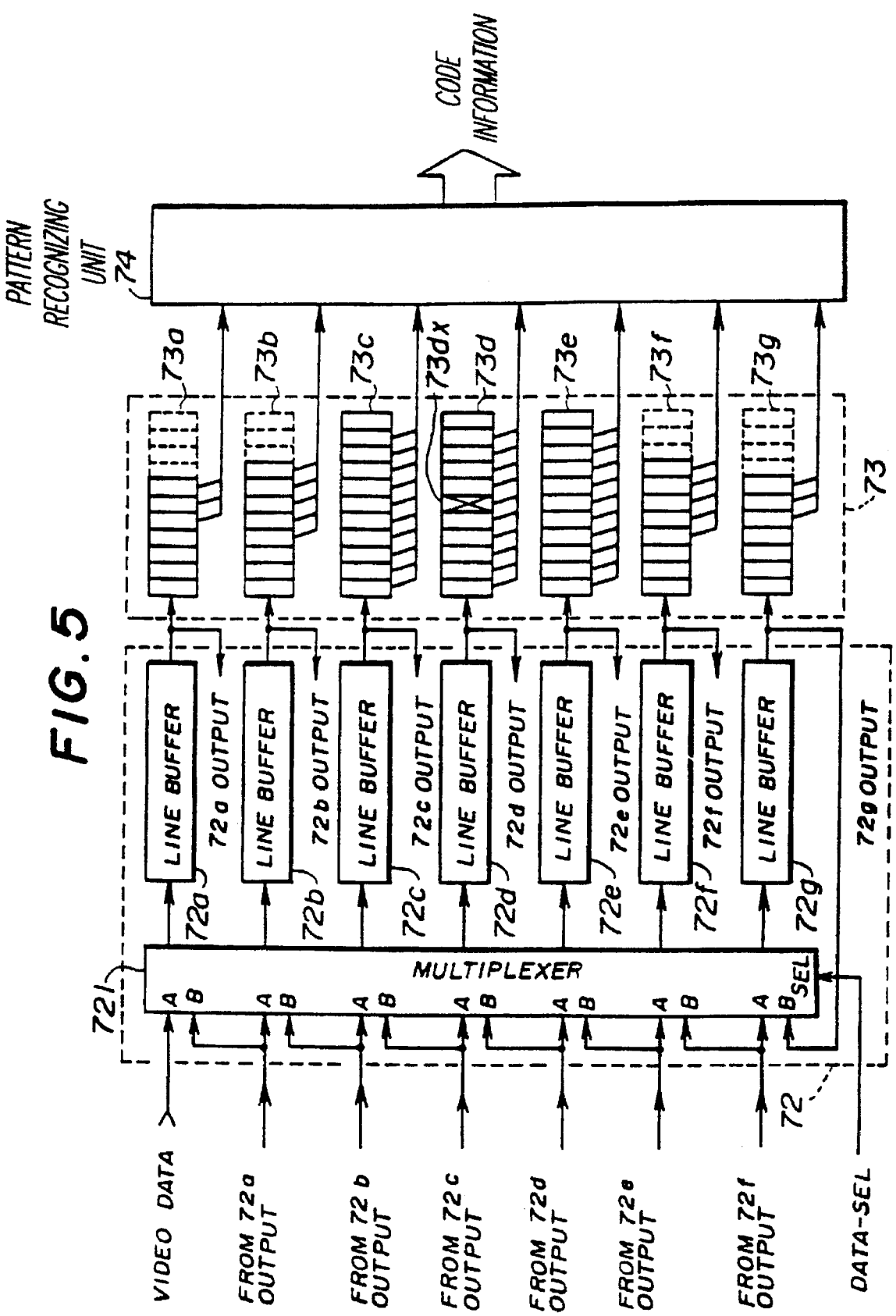
FIG. 5 shows a block diagram of an embodiment of a FIFO memory 72 and a window unit 73 in the construction shown in FIG. 4.

With reference to FIGS. 4 and 5, the above dot-correction unit 7 will now be described.

As shown in FIG. 4, the dot-correction unit 7 includes a parallel/serial converter (which will be referred to as a P/S converter hereinafter) 71, a FIFO (First-In, First-Out) memory 72, a window unit 73, a pattern recognizing unit 74, a memory block 75, a video data outputting unit 76 and a timing control unit 77 which controls the above components so that the components operate in synchronization with one another. The memory block 75 acts as correction data outputting means.

The dot-correction unit 7 further includes a control-signal generating means 78 and an image-region setting means 79 as shown in FIG. 4. The control-signal generating means 78 generates a control signal which is used by the timing control unit 77 for controlling timing according to which image-data processing is performed in the dot-correction unit 7. The image-region setting means 79 sets a plurality of image regions in the bit-map formation of the input image data stored in the internal memory. The timing control unit 77 includes timing signal generating means for supplying a line synchronizing signal (LSYNC-OUT) and a line gating signal (LGATE-OUT) to the controller 3.

The P/S converter 71 is provided for converting the video data supplied by the controller 3 shown in FIG. 1 into the one-bit serial data if the video data is originally 8-bit parallel data. The thus converted 1-bit serial data is then supplied to the FIFO memory 72. Thus, the P/S converter 71 is not a component which is essential in the dot-correction operation. The P/S converter 71 is not necessary if the video data supplied by the controller 3 is serial data.

The FIFO memory 72 includes line buffers 72a through 72g connected to one another in serial via a multiplexer 721 which the FIFO memory 72 also includes, as shown in FIG. 5. The line buffers 72a through 72g store therein the video data of an amount of a plurality of lines (7 lines in this embodiment) in an image, which video data has been supplied by the controller 3.

If the timing control unit 77 supplies the value "0" as a data-sel (data selecting) signal, the multiplexer 721 selects A-input data shown in FIG. 5. That is, the multiplexer inputs the video data supplied by the controller 3 via the P/S converter 71, the 72a-output data, 72b-output data, 72c-output data, 72d-output data, 72e-output data and 72f-output data. Then, the multiplexer 721 outputs the thus-input data to the respective line buffers 72a through 72g. If the timing control unit 77 supplies the value "1" as the data-sel signal, the multiplexer selects B-input data. That is, the multiplexer inputs the 72a-output data, 72b-output data, 72c-output data, 72d-output data, 72e-output data, 72f-output and 72g-output data. Then, the multiplexer 721 outputs the thus-input data to the respective line buffers 72a through 72g.

Figure 6:
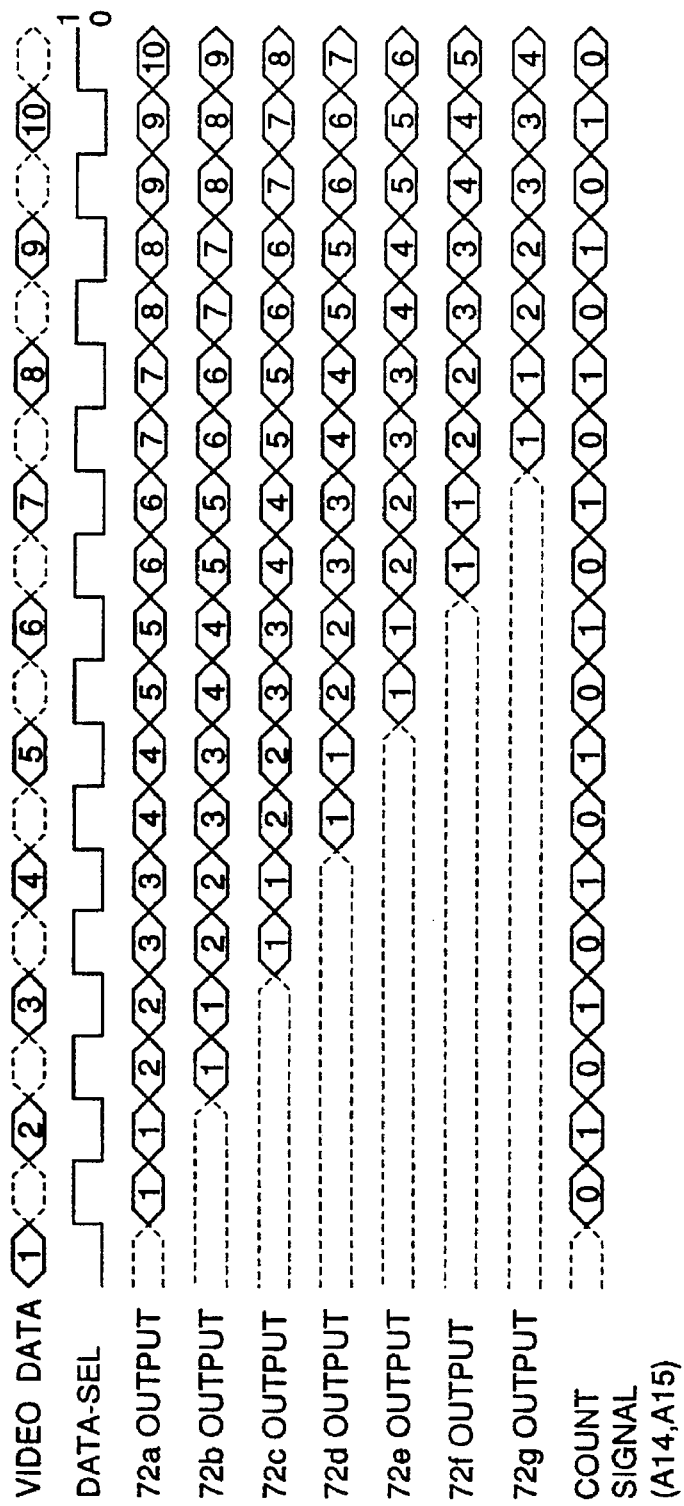
FIGS. 6A, 6B, 6C, 6D, 6E, 6F, 6G, 6H, 6I and 6J show timing charts illustrating an example of operations in the FIFO memory 72 shown in FIG. 5.
Figure 7:
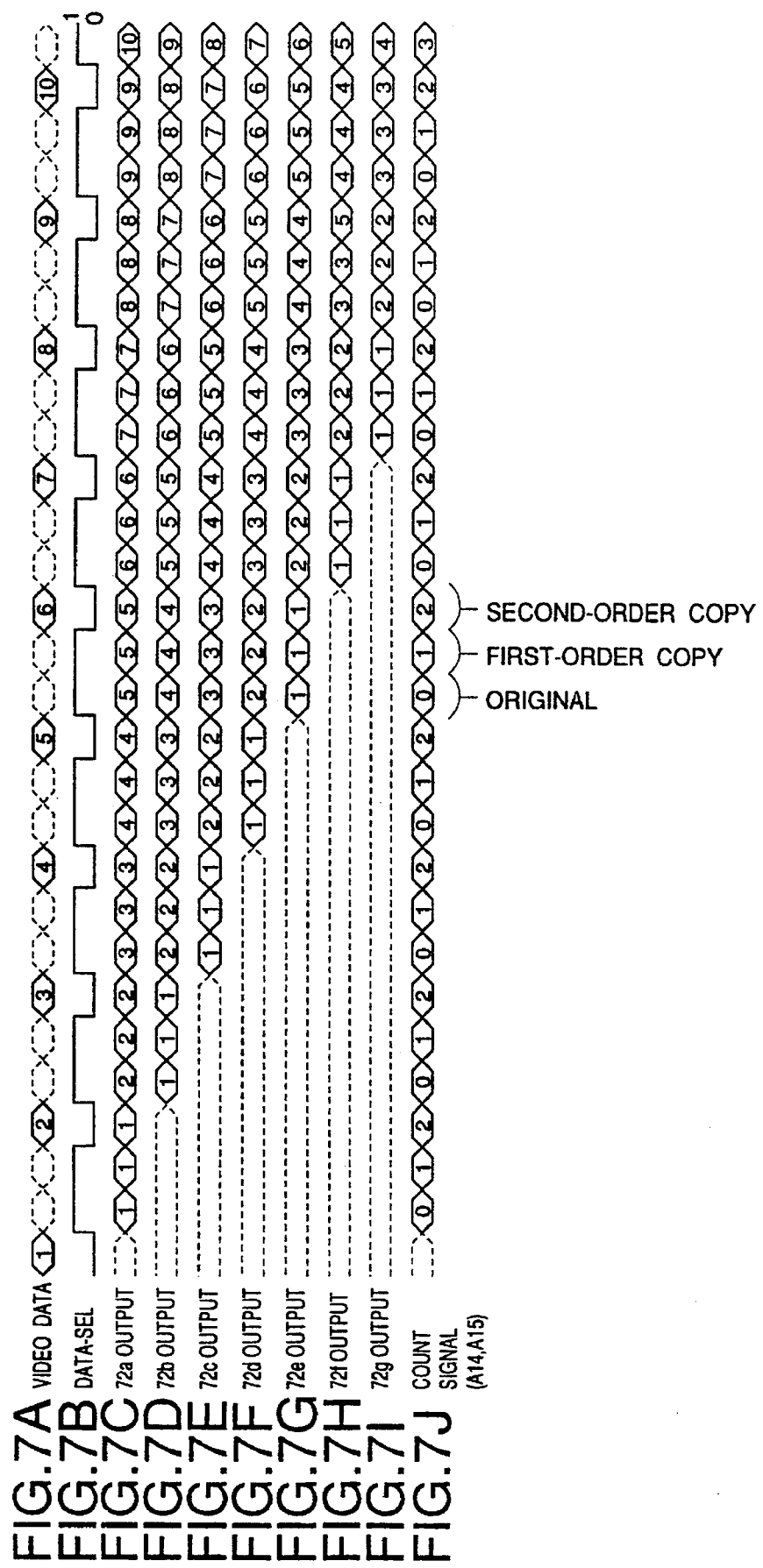
FIGS. 7A, 7B, 7C, 7D, 7E, 7F, 7G, 7H, 7I and 7J show timing charts illustrating another example of operations in the FIFO memory 72 shown in FIG. 5.

Thus, the line buffers 72a through 72g of the FIFO memory 72 supply data shown in FIGS. 6C through 6I and 7C through 7I in response to the video data as shown in FIGS. 6A and 7A being supplied, according to the data-sel signals shown in FIGS. 6B and 7B. Specifically, each set of input video data sets 1, 2, 3, 4, ... shown in FIGS. 6A and 7A is replicated once in FIGS. 6B–6I and twice in FIG. 7B–7I as shown in the figures according to the data-sel signal shown in FIG. 6B or 7B. Each set of the input video data sets 1, 2, 3, 4, ... shown in FIGS. 6A and 7A corresponds to a respective line of the video data, that is, video data constituting a series of pixels arranged along the main scan line. How many times the replication is performed is set by an operator. In this embodiment, the operator may select '4' as the maximum number of video data replication times. The replicated video data sets are output from the line buffers 72a through 72g. Thus, the data-sel signals is used to determine the number of video data replication times and timing according to which the original and replicated video data sets are output.

At the same time as the replicated video data sets are output, a count signal A14 and A15 shown in FIGS. 6J and 7J carrying code information is output from the timing control unit 77. The code information A14 and A15 is produced relevant to the above-described data-sel signal, and indicates replicated orders of the video data sets. The replicated orders will now be described.

In the embodiment of the present invention, each set of video data 1, 2, 3, ... shown in FIGS. 6A and 7A, which has been supplied by the controller 3 shown in FIG. 1 to the dot-correction unit 7, is replicated through a function of the FIFO memory 72 which will be described later. The replication operation is executed during a time period the data-sel signal shown in FIGS. 6B and 7B has the high-level value. In the case shown in FIGS. 6C through 6I, each set of video data is once replicated and in the case shown in FIGS. 7C through 7I, each set of video data is twice replicated.

Particularly in a case, such as shown in the FIGS. 7C through 7I for example, in which replication is carried out many times, thus-replicated sets (which will be referred as copies) of video data are identified as to an order in which each copy has been replicated. In the case shown in FIGS. 7C through 7I, each set of data has two copies, a first-order copy (first obtained from the original set of data) and a second-order copy (second obtained from the original set of data). The above code information A14 and A15 supplied by the FIFO memory 72 indicates such an order of each copy data, in synchronization with the relevant replication as shown in FIGS. 6A–6J and 7A–7J.

Specifically, the code information A14 and A15 indicates '0' when the original of a video data set is output from each of the buffer memories 72a–72g, as shown in FIGS. 6J and 7J. Further, the code information A14 and A15 indicates '1' when the first-order copy of the video data set is output from each of the buffer memories, as shown in the figures. The code information A14 and A15 indicates '2' when the second-order copy of the video data set is output from each of the buffer memories 72a–72g, as shown in the figures. In FIGS. 6A, 6C–6J, 7A, 7C–7J, broken lines represent non-defined data.

The above-mentioned function of the FIFO memory 72 is a function such that both the writing instruction and a reading instruction are supplied to each of the line buffers 72a through 72g. Thus, each of the line buffers 72a through 72g writes thereto the bit of the data supplied thereto and reads therefrom the bit of the data which has been stored therein, according to the FIFO manner, the one-bit writing operation and the one-bit reading operation being carried out simultaneously. Thus, the FIFO memory 72 acts as image data generating means.

Figure 8:
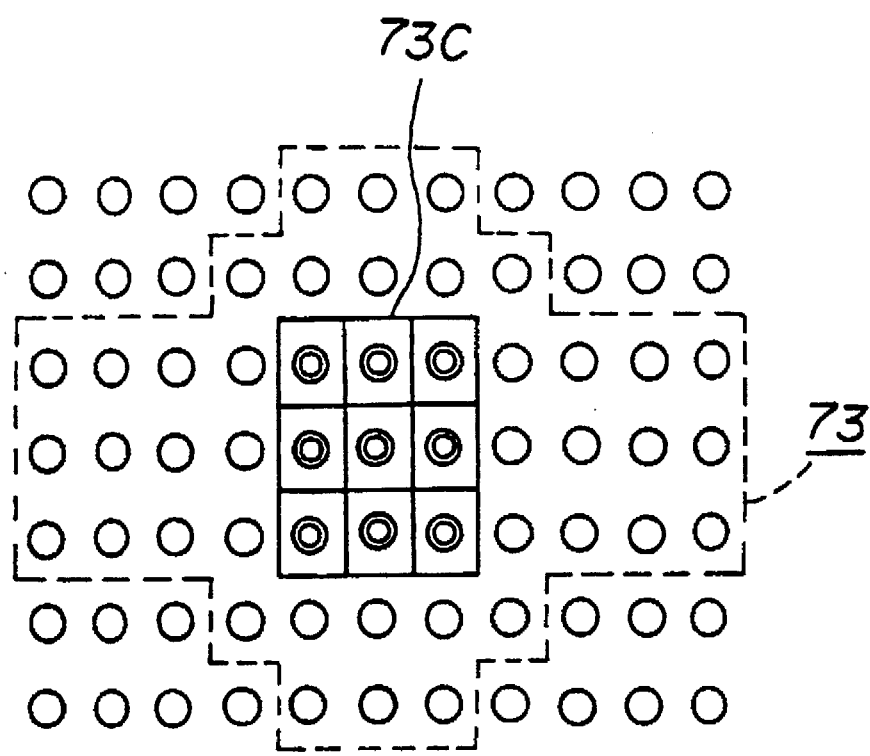
FIG. 8 shows an example of a sample window realized by the window unit shown in FIG. 5.

As shown in FIG. 5, the window unit 73 includes 7 11-bit shift registers 73a through 73g for the seven lines of image data output by the 7 line buffers 72a through 72g. The 11 bit-areas of each shift register are connected in series to the respective one of the above line buffers. These 7 shift registers 73a through 73g correspond to a window (sample window) which is used to detect a pattern in the image represented by input video data. FIG. 8 shows an example of a shape of such a window.

In the window unit 73, a bit area 73dx shown in FIG. 5, the middle position of the middle shift register 73d, is for storing a relevant dot (meaning a dot which is currently being processed) among the dots defined by the window. Among the bit positions of the 7 shift registers 73a through 73g, the bit positions shown by broken lines in FIG. 5 may be omitted if the window shape shown in FIG. 8 is used. That is, each of the shift registers 73a and 73g should have 7 bit positions and each of the shift registers 73b and 73f should have 8 bit positions.

Bits of input video data successively move through the line buffers 72a through 72g and the shift registers 73a through 73g bit by bit. By this movement, a bit corresponding to the above relevant dot changes into another bit sequentially. Finally all the bits of input video data are thus the relevant dot. Thus, the respective windows 73 can be obtained successively for all the bits, each bit corresponding to the respective one of the relevant dots of the windows, of input video data.

The pattern recognizing unit 74 recognizes the characteristics of a shape appearing in each window 73 using the corresponding dot information obtained from the window unit 73. Such a shape is in particular a shape of the boundary between a black-dot region and a white-dot region present on and around the relevant dot in the window 73. The unit 74 then, after recognizing such characteristics, converts the characteristics into a predetermined format of code information which is then output from the unit 74. Such code information is used as an address code indicating the address in the memory block 75 shown in FIG. 4.

Figure 9:
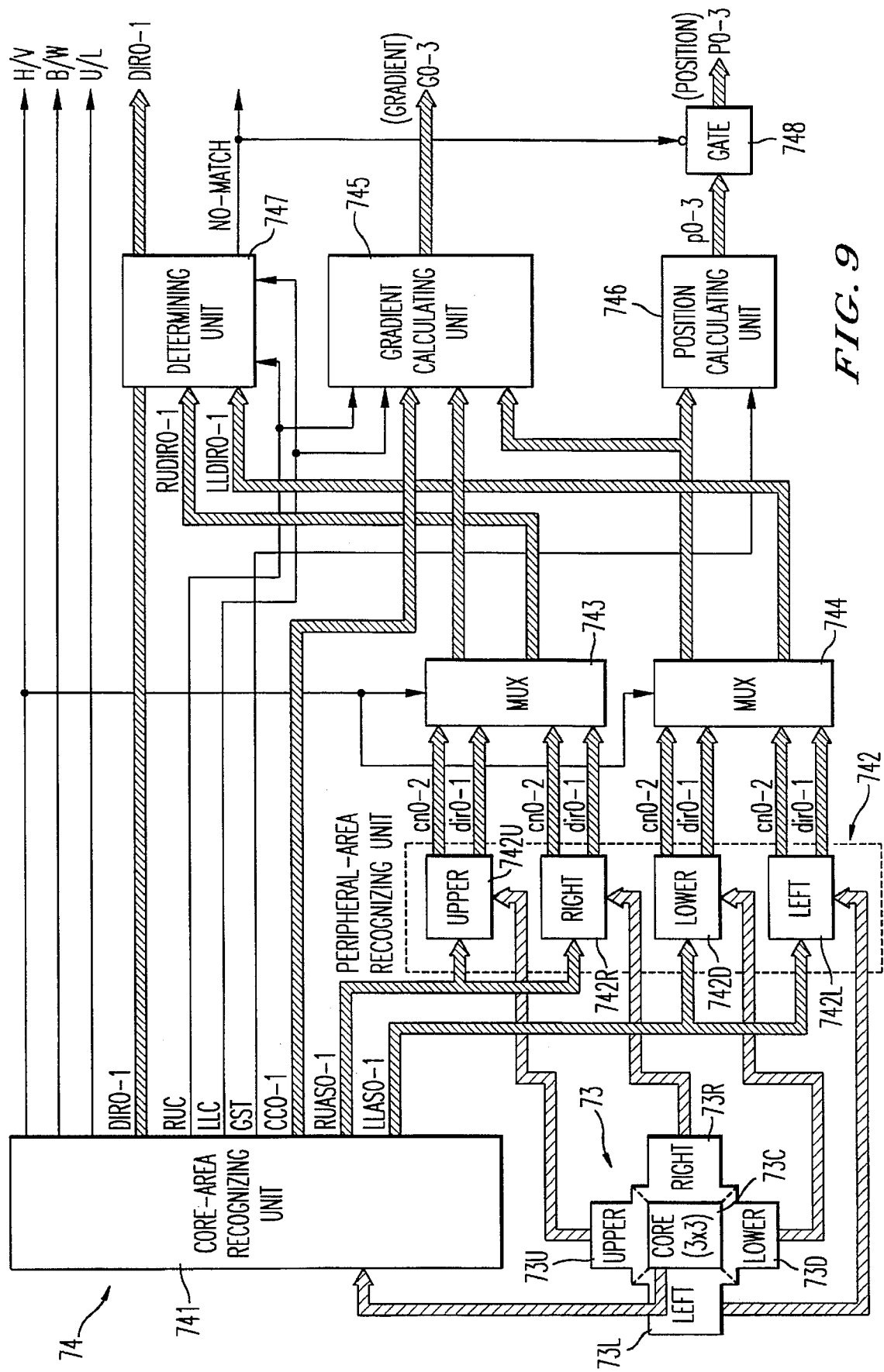
FIG. 9 shows a block diagram of a composition embodiment of a pattern recognition unit 74 shown in FIG. 4 and the relevant output signals.

With reference to FIG. 9, an internal construction in the above pattern recognizing unit 74 in connection with windows 73 such as mentioned above will now be described.

With reference to FIGS. 22A through 22D, each window 73 consists of a core area 73C located at the center of the window and formed of 3×3 dots, an upper area 73U, a lower area 73D, a left area 73L and a right area 73R. The areas 73U, 73D, 73L and 73R are located around the core area 73C as shown in the figures. They will be described later.

The pattern recognizing unit 74 includes a core-area recognizing unit 741, a peripheral-area recognizing unit 742, multiplexers 743, 744, a gradient calculating unit 745, a position calculating unit 746, a determining unit 747 and a gate 748. The peripheral-area recognizing unit 742 includes an upper-area recognizing unit 742U, a right-area recognizing unit 742R, a lower-area recognizing unit 742D and a left-area recognizing unit 742L.

Each unit has the same function as the corresponding unit described in the above-mentioned Japanese Laid Open Patent No.5-207282 and will be described later.

The image-region setting means 79 shown in FIG. 4 is means for an operator to set image regions in the bit-map formation of the input image data as mentioned above. The bit-map formation of the input image data corresponds to a page of the image and is obtained as a result of expanding the input image data by appropriately writing the image data in the internal memory. The image regions are set by defining the image regions as a result of determining relevant coordinate data for particular ones of the image regions in the page of image data. The image-region setting means 79 produces code information A12 and A13 from the above-mentioned coordinate data. The above-mentioned code information A12 and A13 indicates which one of the image regions each coordinate position of the page of image data is positioned in.

Embodiments of block formations and operation thereof of the memory block 75, according to the present invention, shown in FIG. 4, that is, correction data output means, will be described with reference to FIGS. 10 through 13.

Before describing these embodiments, a method such as that disclosed in the above application No.5-207282 will now be described. According to this method, the memory block 75 only includes a pattern memory. Code information such as mentioned above supplied by the pattern recognizing unit 74 is used as the corresponding address in the pattern memory. Thus, previously stored correction data is read out from the pattern memory because the data was stored at the address indicated by the code information. The correction data stored in the pattern memory represents previously prepared image parts (dot patterns) which will be used to replace image parts represented by input image data. Thus, the input image data is corrected. The thus-read correction data is then used as video data for driving a laser. Thus, the correction data becomes the dot pattern resulting from the correction having been performed.

The embodiment according to the present invention shown in FIG. 10 will now be described. Also in this embodiment, the memory block 75 only includes a pattern memory 752. The differences between the above-described method disclosed in the above application No.5-207282 and the FIG. 10 embodiment will now be described. The correction data is read out from the pattern memory 752 in response to supply of the code information from the pattern recognizing unit 74 and other code information A12, A13 from the image-region setting means 79 and A14, A15 from the FIFO memory 72 as shown in FIG. 4.

The code information is used as the address in the pattern memory 752. The above-mentioned code information A14 and A15 is represented by 2-bit data A14 and A15 shown in FIG. 10. The code information supplied by the pattern recognizing unit 74 is represented by 12-bit data. Further, the image-region setting means 79 supplies 2-bit code information A12 and A13. Thus, 16-bit data is used as an address in the pattern memory 752 shown in FIG. 10.

The code information supplied by the pattern recognizing unit 74 indicates the shape of the boundary between the black-dot region and the white-dot region present on and around the relevant dot of the bit-map formation of input image data in the window 73. The code information A14 and A15 supplied by the FIFO memory 72 indicates the above-described replicated order of relevant data. The code information A12 and A13 indicates which one of the image regions the relevant dot of the bit-map formation of input image data is included in.

Advantages obtained by the FIG. 10 embodiment in comparison to the method disclosed in the above application No.5-207282 will now be described. As a result of data replication such as described above, data supplied to the pattern recognizing unit 74 includes identical sets of data for each original set of data, and the corresponding sets of code information are supplied to the pattern memory 752 by the unit 74 as 12-bit data. The 2-bit replicated-order data A14 and A15 such as described above is also supplied to the pattern memory 752 by the FIFO memory 72 in addition to the above 12-bit data. Therefore, it is possible to previously prepare different sets of correction data in the pattern memory 752 for such identical sets of input data of different replicated orders.

Figure 16:
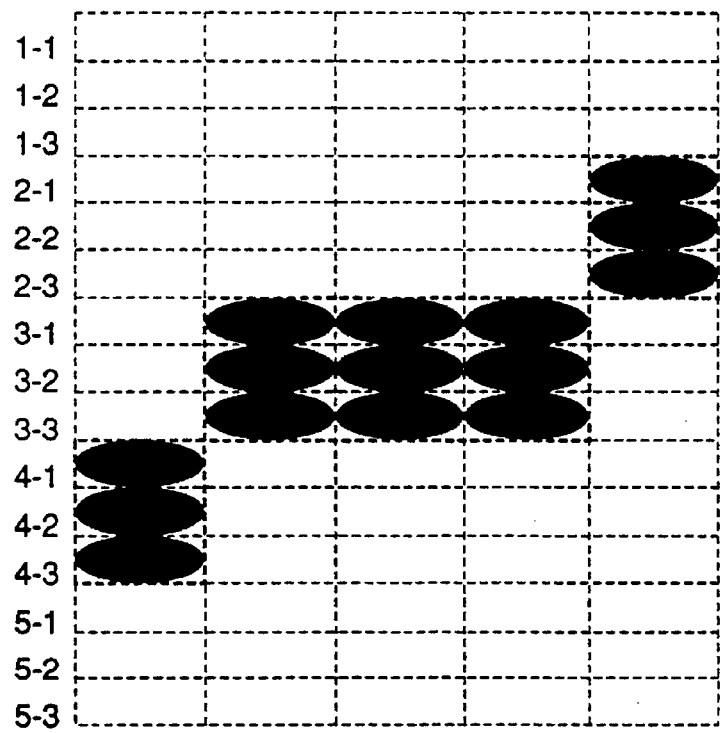
FIG. 16 illustrates a set of dots simply resulting from the three sets of dots shown in FIGS. 15B, 15C and 15D.

The replicated copies of data sets follow to the relevant original data set as shown in FIGS. 6B–6I, 7B–7I. Each data set of the data sets 1, 2, 3, . . . shown in the figures corresponds to a respective line of the video data. Therefore, the replicated copies following the relevant original result in the corresponding replicated lines being successively displayed beneath the corresponding original line, as shown in FIG. 16. In an example shown in FIG. 16, the replicated lines 3-2 and 3-3 are displayed beneath the original line 3-1.

Figure 17:
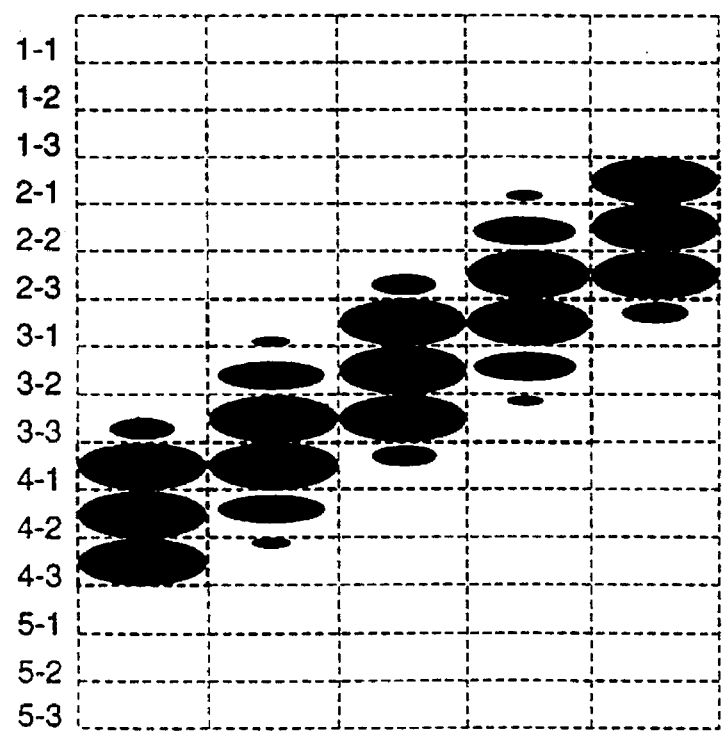
FIG. 17 illustrates a set of dots resulting from the three sets of dots shown in FIGS. 15B, 15C and 15D after dot-correction processes have been performed on the three sets of dots in manners different for particular sets of dots.

By previously preparing different sets of correction data for identical sets of input data of different replicated orders as mentioned above, it is possible to achieve effective jag elimination as shown in FIG. 17. In the example of FIGS. 16 and 17, from the FIG. 16 state to the FIG. 17 state, the lines 3-1, 3-2, and 3-3 are differently changed although these lines are initially identical. Such dot-correction can be performed as a result of identifying the original and replicated video data sets using the code information A14 and A15.

In this embodiment of the present invention, the above replication operation generates many identical sets of image data for each line of the original image represented by input image data. The pattern recognizing unit 74 recognizes the line shapes represented, in a bit-map formation, by many identical sets of image data. As a result, the thus-obtained sets of code information are identical. These identical sets of code information can be identified by the 2-bit replicated-order data A14 and A15.

Further, in addition to the 12-bit data and 2-bit data A14 and A15, the 2-bit image region data A12 and A13 is also supplied to the pattern memory 752 from the image-region setting means 79. Therefore, it is also possible to previously prepare different sets of correction data in the pattern memory 752 for each combination of the 12-bit data supplied by the pattern recognizing unit 74. Each set of those different sets of correction data is used for the relevant dot included in a respective one of the image regions.

There may be a case where identical image parts are included in different ones of the image regions. In such a case, the pattern recognizing unit 74 recognizes the identical image parts and the thus-obtained sets of code information are identical. These identical sets of code information can be identified by the 2-bit image region data A12 and A13.

A FIG. 11 embodiment will now be described. In this embodiment, the memory block 75 includes a table memory 751 in addition to the pattern memory 752. The 12-bit code information supplied by the pattern recognizing unit 74, the 2-bit code information A12, A13 supplied by the image-region setting means 79 and the 2-bit code information supplied by the FIFO memory 72 are supplied to the table memory 751. Other code information indicating the addresses in the pattern memory 752 is stored in the table memory 751.

The appropriate set of code information is read out from the table memory 751 by using the above 12-bit data, 2-bit data A12, A13 and 2-bit data A14, A15 as a relevant address in the table memory 751. Then, according to the address, in the pattern memory 752, specified by the set of code information thus read out from the table memory 751, the appropriate set of correction data is read out from the pattern memory 752.

Figure 10:
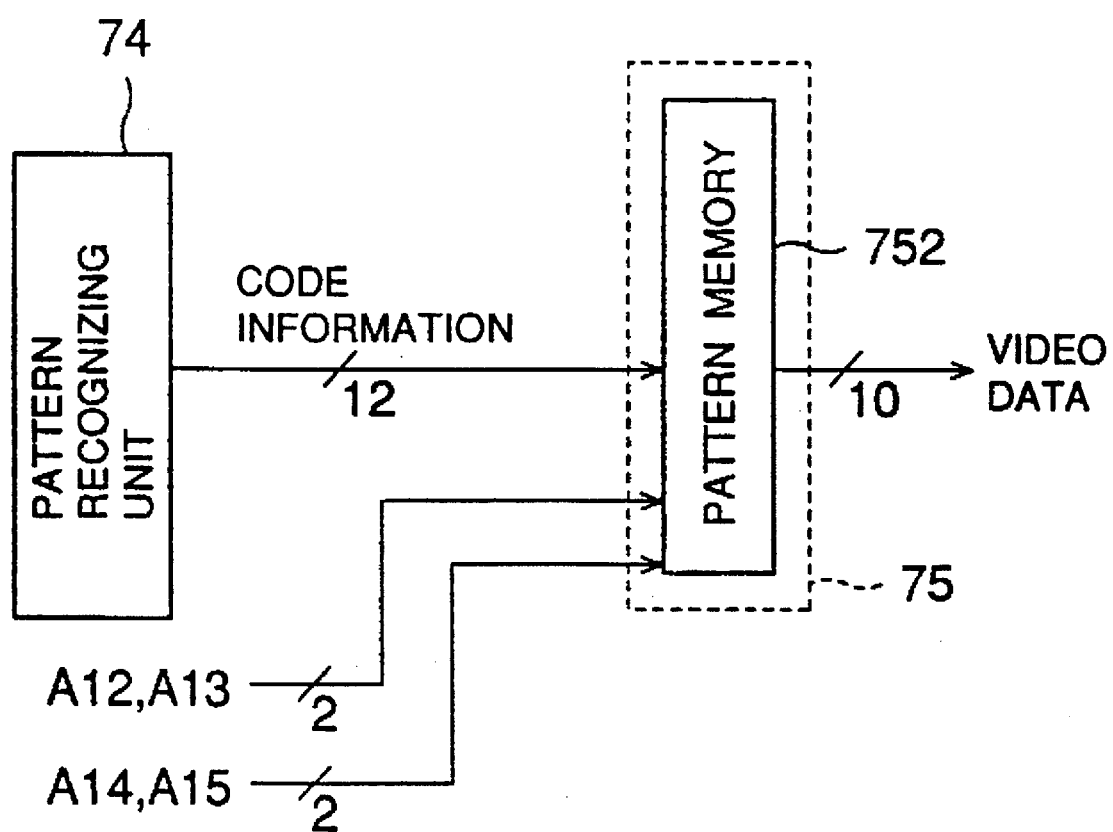
FIGS. 10, 11 and 12 show block diagrams of embodiment constructions of a memory block 75 shown in FIG. 4.
Figure 11:
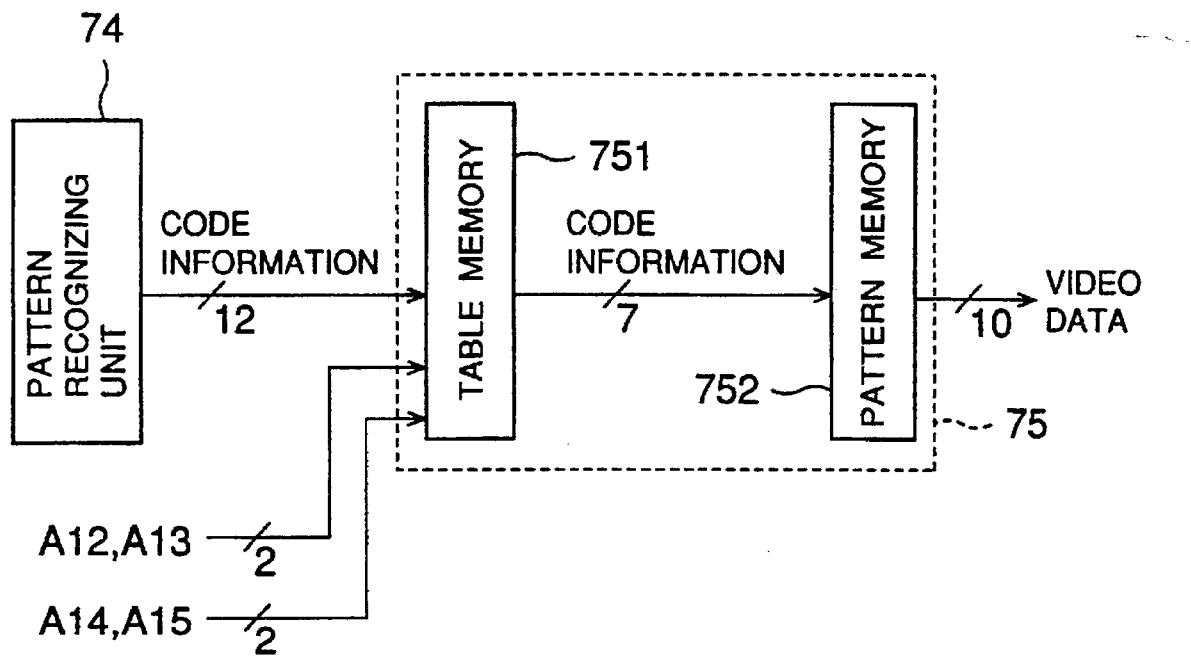

A formation such as that shown in FIG. 11 is effective under an assumption which may be applied to many cases in the image forming technology field and will now be described. In the FIG. 10 embodiment, the pattern memory 752 has a number of sets of correction data and this number is the same as the number of possible different sets of code information which may be supplied by the pattern recognizing unit 74. However, a number of sets of correction data, that is, a number of dot patterns to be used to replace original image parts need not necessarily be the same as the demanded number of sets of code information (image-part patterns represented by input image data) which may be supplied by the pattern recognizing unit 74. That is, a plurality of possible different image-part patterns of input data require to be replaced by a common dot pattern for the purpose of jag correction such as described above. This is the above assumption and may be a fact under the condition that an efficient and effective jag correction is attempted.

If the above assumption is applied to the FIG. 10 embodiment, the pattern memory 752 includes many redundant dot patterns. The FIG. 11 embodiment, however, can eliminate such redundant dot patterns from the pattern memory 752. Thus, it is possible to reduced the total memory capacity of the memory block 75 although the memory block 75 has two memories 751 and 752, without causing any substantial jag-correction performance degradation. Such elimination of redundant dot patterns in the pattern memory 752 reduces a number of bits (bit width) representing code information to be supplied to the pattern memory 752. In fact, 7-bit code information is used to obtain correction information from the pattern memory 752 in the FIG. 11 and FIG. 12 embodiments while 12-bit code information is used for the same purpose in the FIG. 10 embodiment.

Further, the FIG. 11 embodiment has advantages the same as those obtained in the FIG. 10 embodiment by using replicated-order information A14, A15 and image region information A12, A13.

The FIG. 12 embodiment will now be described. The code information is read out from the table memory 751, which information is previously stored at the address therein indicated by code information supplied by the pattern recognizing unit 74. Then, the correction information is read out from the pattern memory 752, which information is previously stored at the address therein indicated by code information read out from the table memory 751, the replicated order code information A14, A15 and the image-region code information A12, A13.

Figure 12:
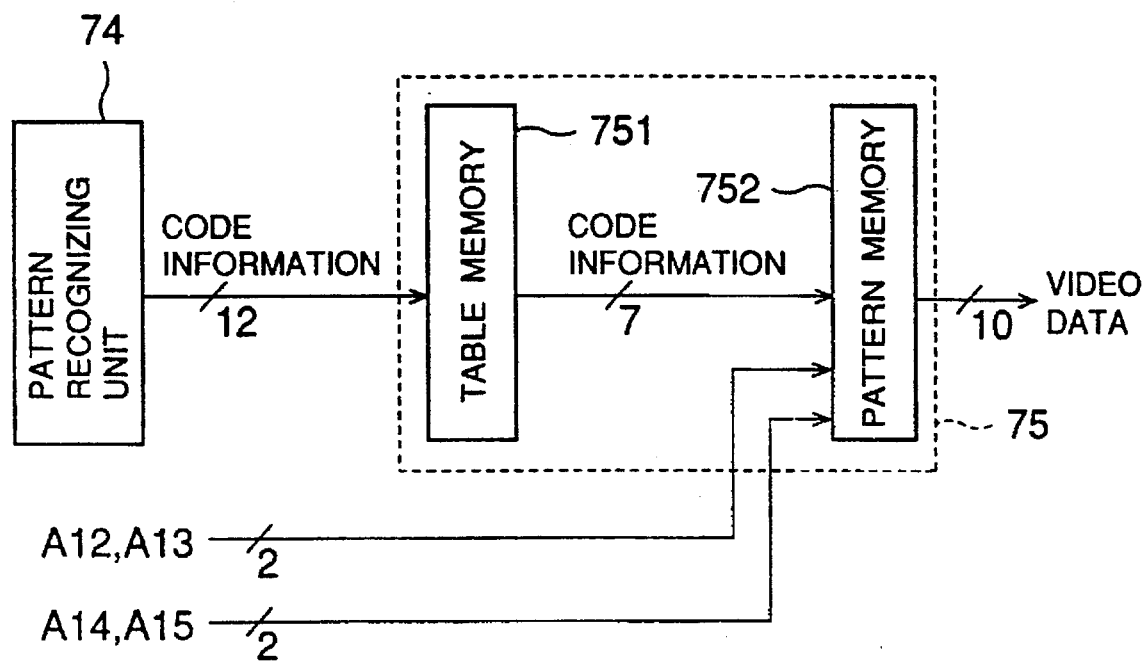

As in the case of FIG. 11 embodiment, the FIG. 12 embodiment is also effective to reduce the total memory capacity required for the memory block 75. The FIG. 12 embodiment can further reduce the total memory capacity if the number of image-part patterns which may be handled using the table memory 751 is significantly larger than the number of different dot patterns stored as correction information in the pattern memory 752. Adding 4-bit code information (including the 2-bit code information A12, A13 and 2-bit code information A14, A15) to information indicating addresses in a memory multiplies the capacity of the memory by $2^4$. If the number of patterns which may be handled by the table memory 751 is significantly larger than the number of different patterns stored in the pattern memory 752, the memory capacity of the table memory 751 before being multiplied by $2^4$ is larger than that of the pattern memory 752 before being multiplied by $2^4$. In such a case, to reduce the total memory capacity, it is more effective to multiply the memory capacity of the pattern memory by $2^4$ than that of the table memory. Thus, the FIG. 12 embodiment is effective to reduce the total memory capacity. See the comparison shown in FIG. 13. Even though such a memory formation way is effective to reduce the total memory capacity, no jag-correction performance degradation is caused by the memory capacity reduction.

Further, the FIG. 12 embodiment has the same advantages as those obtained in the FIG. 11 embodiment by using replicated-order information such as that described above.

FIG. 13 shows a comparison of necessary memory capacity between the method of the above application No.5-207282, the FIG. 10 embodiment method, the FIG. 11 embodiment method and the FIG. 12 embodiment method. Each set of correction information such as described above to be finally read out from the pattern memory 752 is 10-bit information (that is, the bit width is 10) in each method. Further, the number of image-part patterns which may be supplied by the pattern recognizing unit 74 and can be handled by the memory block 75 is 4096 bits in each method. This is because each set of code information supplied by the pattern recognizing unit 74 is 12-bit information. $2^{12}=4096$.

Thus, in the method of the above application No.5-207282, the total memory capacity is 40960 bits as a result of multiplying the above 4096 (bits) and the above 10 (bit width of correction information) together. In the FIG. 10 embodiment, as a result of adding the code information A12, A13 and A14, A15 to information to be used as addresses in the pattern memory 752, the total memory capacity is 655360 bits as a result of multiplying the above 40960 and $2^4$ of the A12–A15 information. In the FIG. 11 embodiment, the code information to be used as addresses in the pattern memory 752 is 7-bit information in contrast to 10-bit information used in the method of the above application No.5-207282 and the FIGS. 10 embodiment.

The reason for this bit-width reduction will now be described. The number of dot patterns represented by the correction information stored in the pattern memory is reduced. This is possible because, as described above, redundant dot-patterns are eliminated from the pattern memory. As a result, the number of the stored dot patterns is reduced from the above 4096 to 128 ($=2^7$). Thus, the memory capacity of the pattern memory in the FIG. 11 embodiment is 1280 bits, as shown in FIG. 13, as a result of multiplying the above 128 and the above correction-information bit width 10 together.

The capacity 458752 bits of the table memory 751 in the FIG. 11 embodiment is obtained by multiplying the above 7 (the above bit width of code information to be supplied to the pattern memory 752 as its addresses) and $2^{(12+4)}$ together. The above exponent 12+4 is obtained by the bit-widths of the code information supplied by the pattern recognizing unit 74 and the code information A12, A13 and A14, A15.

In the FIG. 12 embodiment, the capacity 20480 bits of the pattern memory 752 is obtained by multiplying that 1280 bits of the memory 752 in the FIG. 11 embodiment and $2^4$. The capacity 28672 bits of the table memory 751 is obtained by dividing the 458752 bits of the memory 751 in the FIG. 11 embodiment by the same $2^4$. The exponent 4 of the above $2^4$ is the bit width of the A12, A13, and A14, A15 code information. The above capacity change results from changing the memory, to which the A12, A13, and A14, A15 information is sent, from the table memory 751 to the pattern memory 752. Thus, the total memory capacity can be reduced in the FIG. 12 embodiment, although the jag-correction performance is substantially the same among the FIGS. 10, 11 and 12 embodiments. Any of the methods of the above application No.5-207282, the FIGS. 10 method, the FIG. 11 method and the FIG. 12 method can be used in the embodiment of the present invention.

10-bit correction information is supplied from the memory block 75 (in particular, from the pattern memory 752) in the FIGS. 10, 11, and 12 embodiments as shown in the figures. The respective 10 bits in each correction information set may indicate which color, whether black or white, 10 corresponding respective segments including a relevant dot are painted, respectively. The relevant dot is subsequently each dot of the video data supplied by the controller 3 shown in FIG. 1.

In the above-described dot-correction unit 6 in the embodiment of the present invention, the memory block 75 supplies such correction information, having the bit-width of 10 for example, in a bit-parallel manner. The above-mentioned segments correspond to time periods obtained as a result of dividing a predetermined time period which is prepared for each dot. The above predetermined time period is one for which the laser of the laser diode unit 50 shown in FIG. 3 emits light so as to realize the relevant dot on the surface of the above-mentioned drum 15 shown in FIG. 3.

The video-data output unit 76 shown in FIG. 4 receives the parallel-bit correction information supplied by the memory block 75 and converts it into serial-bit form which is then supplied to the printer engine 4 shown in FIG. 1. The thus-supplied correction information is used to control the LD unit 50, shown in FIG. 3, provided in the writing unit 26. Thus, the laser diode of the LD unit 50 emits light or stops it appropriately.

The above conversion of the bit-parallel correction information into the serial form as mentioned above is necessary if the light emission ON/OFF control method used for the LD unit 50 is that using two-tone data input thereto. If the ON/OFF control method is that using multi-tone data, such parallel-bit to serial-bit conversion is not necessary. In the latter case, the bit-parallel correction information supplied from the memory block 75 is directly used as multi-tone data to perform the ON/OFF control of the laser diode in the LD unit 50 so that the writing unit 26 appropriately writes the corresponding dot image.

It is also possible within the scope of the present invention that any data supplied from either table memory 751 or pattern memory 752 used in the above-described embodiments is used as bit-parallel information to directly perform the ON/OFF control of the multi-tone control LD unit similarly to the case where the bit-parallel correction information is used for the same purpose.

Further, such bit-parallel information (including bit-parallel correction information) indicates line-shape (of a boundary line present between a black-dot region and a white-dot region represented by relevant video data in the bit-map formation) characteristics obtained for each dot through the pattern recognizing process performed by the pattern recognizing unit 74 as described above. Thus, it is also possible to use such bit-parallel information, in addition to the use in the ON/OFF control of the above laser diode, as data to be processed by the CPU for performing various image manipulating processes such as image magnification and reduction in size. Any information of the code information supplied by the pattern recognizing unit 74, that supplied by the table memory 751 and that supplied by the pattern memory 752 may be used for the above purpose.

Further, it is possible to provide means for converting the above-mentioned replicated-order code information A14, A15 supplied by the FIFO memory 72 shown in FIG. 4 to reverse-replicated-order code information. This conversion is such that, in the reversed-replicated-order code information, the replicated order of the original video data set and the replicated copies of video data sets are reversed from the replicated order in the code information A14 and A15.

In this case, the reversed-replicated-order code information may be supplied to the memory block 75 instead of the replicated-order code information A14, A15. As a result, the above-described dot-correction manner, in which the original line and replicated lines are differently corrected as shown in FIGS. 16 and 17, can be easily changed. If this case is applied to the example of FIGS. 16 and 17, the displaying order of lines 3-1, 3-2 and 3-3 may be reverse of that shown in FIG. 17. Accordingly, in this case, the display of FIG. 17 may be changed to that in which the line 3-1 is at the bottom, the line 3-2 is at the middle and the line 3-3 is at the top. Thus, it is possible to easily manipulate the image to be displayed. Thus, substantial increase of a number of dot patterns as the correction data can be easily achieved without increasing the capacity of the pattern memory 752.

The function of the timing control unit 77 will now be described. The timing control unit 77 receives an FGATE signal, an LGATE signal, an LSYNC signal, an image clock signal WCLK and a RESET signal from the engine driver 4 and generates clock signals and so forth to the blocks 71 through 76 to make synchronization thereamong. The FGATE signal defines a one-page writing time period. The LGATE signal defines a one-line writing time period. The LSYNC signal indicates writing starting and ending timings for each line. The signal WCLK defines a one-dot reading and writing time period. Further, the timing control unit 77 includes the above-mentioned timing-signal generating means.

An operation fundamental clock signal supplies clock pulses to the timing control unit 77 and determines the basic operation progress of the unit 77. The above fundamental clock signal is different from those supplied by the engine driver 4 and is either the control signal supplied by the control-signal generating means 78 provided within the dot-correction unit 7 or a control signal supplied by a suitable signal generating means provided outside the dot-correction unit 7. The control-signal generating means 78, if it is provided, includes a voltage controlled oscillator. The above suitable signal generating means, if it is provided outside the unit 7, includes a voltage controlled oscillator, crystal oscillator or the like.

The correction data previously stored in the pattern memory 752 shown in FIG. 11 and so forth may be previously selectively loaded therein by either the MPU 31 in the controller 3 shown in FIG. 1 or the CPU 41 in the engine driver 4 using data stored in the RAM 32 or 42. Alternatively, it is also possible that the host computer 1 loads the necessary data in the pattern memory 752. Thus, various correction data may be arbitrarily used by easily changing currently loaded data.

With reference to FIGS. 14A, 14B, 15A, 15B–15D, 16, 17, 18A–18C, actual examples will now be described.

Figure 14B:
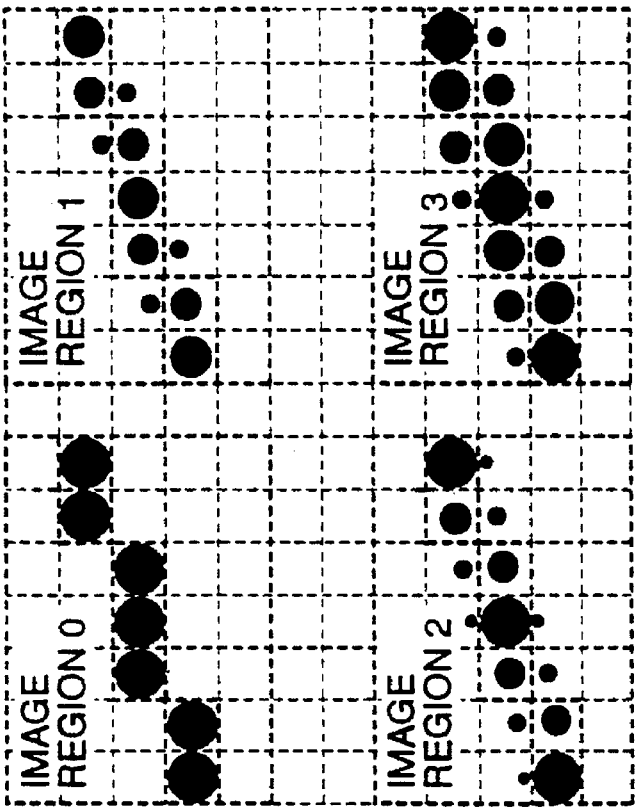
FIGS. 14A and 14B illustrate states in which four image regions are set in image data in a bit-map formation, FIG. 14A illustrating an original state and FIG. 14B illustrating a state having undergone an example of a dot-correction process.
Figure 14A:
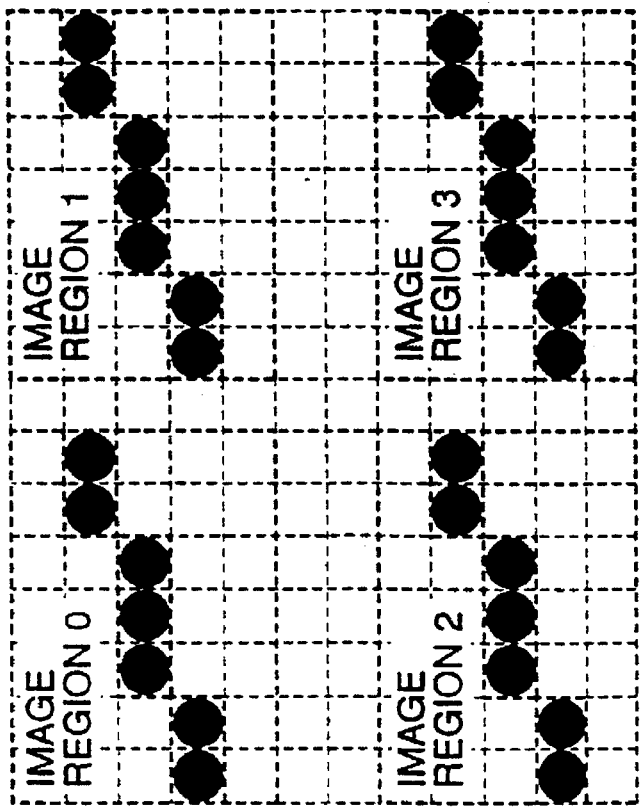

In an example show in FIGS. 14A and 14B, a bit-map formation of image data includes four identical images, each image including 7 dots as shown in FIG. 14A. Further, four image regions 0, 1, 2 and 3 are set for including the four identical images, respectively, as shown in the figures, through the image-region setting means 79 shown in FIG. 4. Different sets of correction data may be previously prepared in the pattern memory 752 for such identical images included in different image regions such as the four image regions 0, 1, 2 and 3 shown in FIG. 14A, respectively. As a result, it is possible to produce an image shown in FIG. 14B in which the four identical images included in the different image regions 0, 1, 2, 3 shown in FIG. 14A are differently corrected.

Such dot correction can be performed as a result of identifying the identical sets of video data included in the different image regions using the code information A12 and A13. By using such a dot-correction manner, it is possible to automatically produce a variety of video images such as that shown in FIG. 14B.

In fact, four sets of the code information indicating line shapes, which are supplied by the pattern recognizing unit 74 as a result of recognizing the four identical images shown in FIG. 14A, respectively, are identical accordingly. However, four different sets of the image region code information A12, A13 relevant to the four image regions 0, 1, 2, 3 are simultaneously supplied to the memory block 75 from the image region setting means 79. By using of the image region code information, the pattern memory 752 supplies relevant four different sets of correction data which results in the four different images shown in FIG. 14B.

With reference to FIGS. 15A and 15B, the video data set replication will now be described. By the above-described function of the FIFO memory 72 shown in FIG. 5, the twice data set replication is performed as shown in FIGS. 7A–7J, for example. As a result, each of five lines 1, 2, 3, 4, and 5 of a bit map is replicated and thus 15 lines 1-1, 1-2, 1-3, 21, 2-2, 2-3, 3-1, 3-2, 3-3, 4-1, 4-2, 4-3, 5-1, 5-2, and 5-3 shown in FIGS. 15B, 15C and 15D are produced. An image shown in FIG. 15A including 5 dots is accordingly replicated and thus three identical images shown in FIGS. 15B, 15C and 15D are produced.

In order to realize such a replication, by using the data-sel signal shown in FIG. 7B, three, in this example, identical data sets are produced according to an appropriate timing signal such as the above-mentioned LSYNC signal. The LSYNC signal indicates timing at which writing of each line of video data in the main scan line on the drum 15 by the LD unit 50 shown in FIG. 3 is started and ended. Another signal in synchronization with the LSYNC signal but slightly different in phase may also be used for the same purpose.

Further, under the timing control of the timing control unit 77 shown in FIG. 4, the FIFO memory 72 outputs the video data to the pattern recognizing unit 74 shown in the figure in a period which is ⅓ the period of the original video data. The period is a period of scanning along the sub-scan direction perpendicular to the main scan direction. As a result, a height of each segment of the bit map of the resulting video data shown in each of FIGS. 15B, 15C and 15D is ⅓ a height of each segment of the bit map of the original image data shown in FIG. 15A, as shown in the figures.

Three sets of the code information indicating line shapes, which are supplied by the pattern recognizing unit 74 as a result of recognizing the three identical images shown in FIGS. 15B, 15C and 15D, respectively, are identical accordingly. However, three different sets of the replicated-order code information A14, A15 relevant to the original and two copies shown in FIGS. 15B–15C are simultaneously supplied to the memory block 75 from the FIFO memory 72. By using the replicated-order code information, the pattern memory 752 may supply relevant three different sets of relevant correction data.

As described above, the replicated copies following the relevant original results in the corresponding replicated lines being successively displayed beneath the corresponding original line, as shown in FIG. 16. As shown in the figure, the replicated lines 3-2 and 3-3 are displayed beneath the original line 3-1, for example.

Figure 18A:
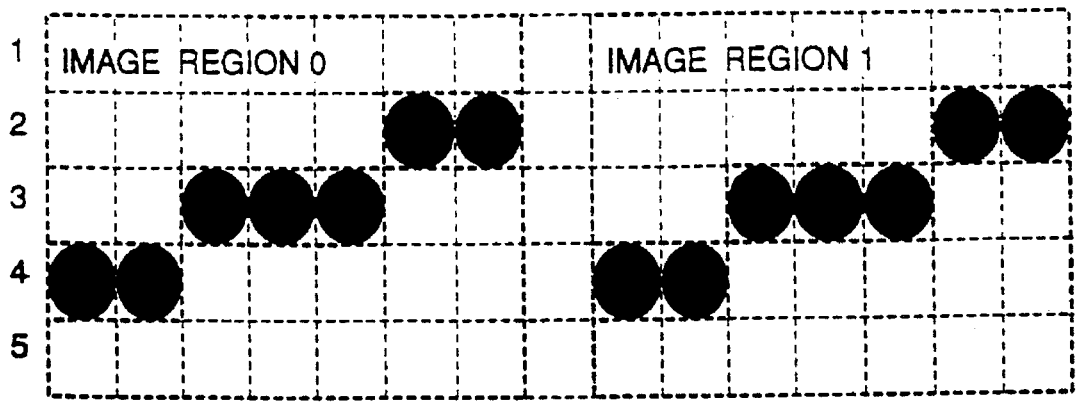
FIGS. 18A, 18B and 18C illustrate multiple dot set production and subsequent dot-correction such as that shown in FIGS. 15A, 15B, 16 and 17 performed on two image regions of image data in a bit-map formation.
Figure 18B:
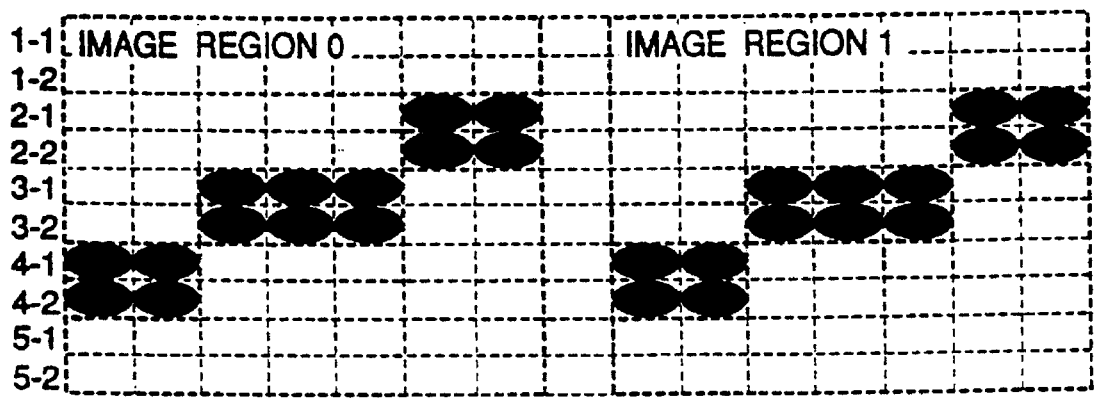
Figure 18C:
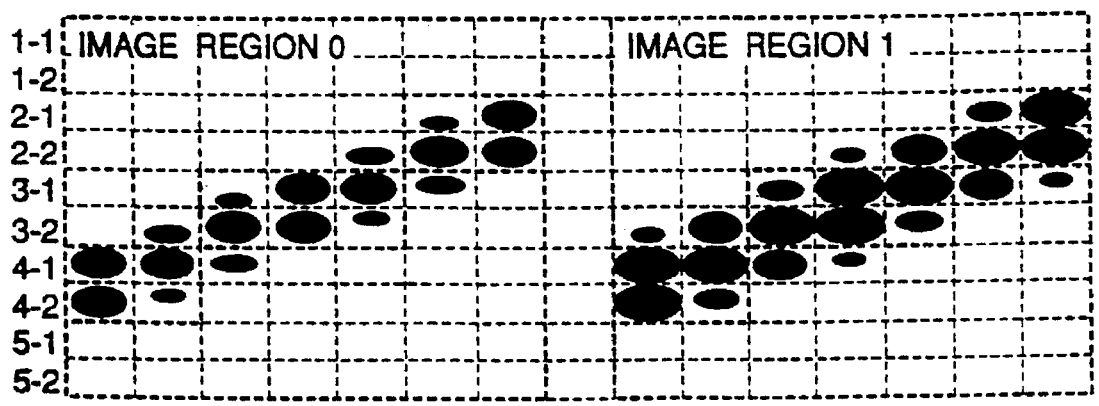
Figure 19A:
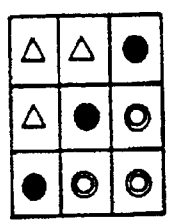
FIGS. 19A, 19B, 19C and 19D illustrate various types of line recognition patterns for recognizing a 45°-oblique line in a core area in a window 73 shown in FIG. 8.
Figure 19B:
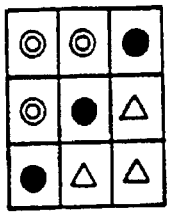
Figure 19C:
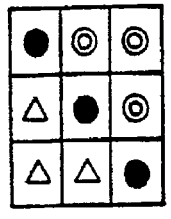
Figure 19D:
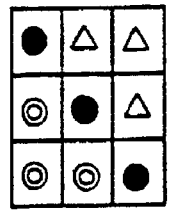
Figure 20A:
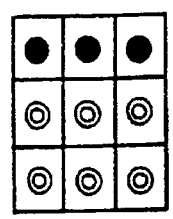
FIGS. 20A, 20B, 20C, 20D, 20E, 20F and 20G illustrate various types of line recognition patterns for recognizing a horizontal line or an approximately horizontal oblique line in the above core area.
Figure 20B:
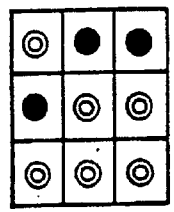
Figure 20C:
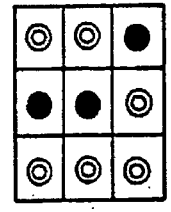
Figure 20D:
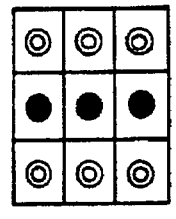
Figure 20E:
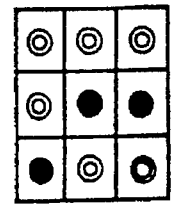
Figure 20F:
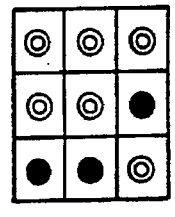
Figure 20G:
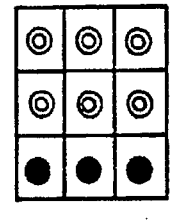
Figure 21A:
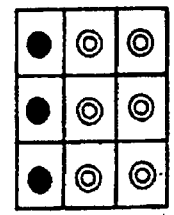
FIGS. 21A, 21B, 21C, 21D, 21E, 21F and 21G illustrate various types of line recognition patterns for recognizing a vertical line or an approximately vertical oblique line in the above core area.
Figure 21B:
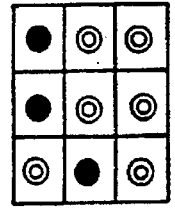
Figure 21C:
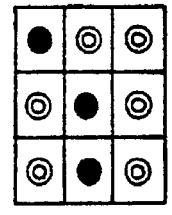
Figure 21D:
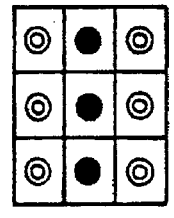
Figure 21E:
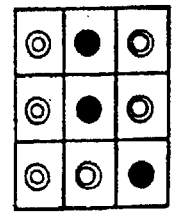
Figure 21F:
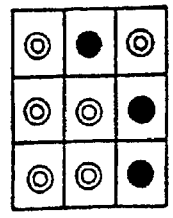
Figure 21G:
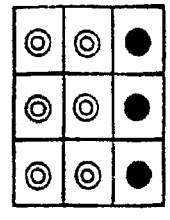

It is also possible to set a plurality of image regions in a bit-map formation of image data as shown in FIGS. 14A and 14B, and, in addition, have each line of the corresponding video data be replicated as shown in FIGS. 15A, 15B, 16 and 17. In an example shown in FIGS. 18A, 18B and 18C, two image regions are set in a bit-map formation of image data as shown in FIGS. 18A. Each image region includes an image including 7 dots, which image is identical between the two image regions as shown in the figure. Then, each line of the corresponding video data is once replicated and thus each dot is vertically divided into two dots as shown in FIG. 18B. Then, in each image region, dot correction is different between each of original lines 1-1, 2-1, 3-1, 4-1, 5-1 and a respective one of replicated lines 1-2, 2-2, 3-2, 4-2, 5-2. Further, in addition to the above-mentioned dot correction difference between the original and the copy, dot correction is also different between the two image regions as shown in FIG. 18C. Thus, it is possible to automatically produce a variety of video images.

A technology used in the above-described embodiments of the present invention will now be described, which technology is also used in the above-mentioned laid-open application No.5-207282. With reference to FIGS. 8, 19A through 29, a window-area separation operation is to be performed prior to a pattern matching operation, patterns are to be detected and areas are to be used for the pattern detection.

Windows 73 such as mentioned above will now be described. Each window area is defined by a sample window having dimensions 7 (height)×11 (length) as shown in FIG. 8 and realized by the 7-line shift registers 73a through 73g shown in FIG. 5 as described above. Each line of shift register includes 11-bit registers as shown in FIG. 5. Thus, the above 7-line shift registers 73a through 73g supply 77-bit data (7×11) corresponding to the 77 dots (7×11) shown in FIG. 8. Among the 77 dots, 49 dots enclosed by the broken line shown in the figure are used to detect specific patterns. These specific patterns are approximately vertical lines or approximately horizontal lines. Such lines to be detected are boundary lines present between a black-dot region and a white-dot region.

Core areas will now be described. The core area in the FIG. 8 example is the core area 73C having the dimensions 3×3 dots enclosed by the solid line shown in the figure. The central dot in the 3×3 dots is a relevant dot currently processed in the jag-correction operation.

FIGS. 19A through 21G show line patterns represented by black dots within a core area 73C such as described above, each line having a width of a single dot. In the figures, black-painted circles represent black dots, double circles represent white dots and triangles represent dots which may be either black or white dots.

FIGS. 19A through 19D illustrate line patterns having 45-degree (½) gradients (slopes). Such line patterns are not ones to be corrected in the jag-correction operation in the embodiments described above. Line patterns to be extracted to be corrected in the jag-correction operation are either approximately horizontal ones having gradients equal to or less than the ½ slope or approximately vertical ones having gradients equal to or more than the ⅔ slope. In the embodiments, such kinds of line patterns are assumed to be recognized as jags in final images by users. The embodiments recognize approximately horizontal lines and approximately vertical lines, such as those mentioned above, similarly. The only difference between the above two recognizing processes is that the approximately vertical line pattern is rotated away from the approximately horizontal line pattern by a 90-degree angle. Thus, for the sake of simplicity, only cases for approximately horizontal lines will be mainly described, hereinafter.

FIGS. 20A through 20G illustrate approximately horizontal line patterns. Line patterns which have gradients equal to or less then the ½ slopes are the following two types of patterns in such 3×3 core areas. A first type of patterns consists of those shown in FIGS. 20B, 20C, 20E and 20F. The dot patterns shown in the figures corresponding to gradient lines having certain degrees of gradients represented by the relevant image data. The above degrees are more than the limit for representing the image data with the right horizontally arranged dot series. Thus, each of the resulting dot series is one in which black dots are arranged on two different step heights. The second type of patterns consists of those shown in FIGS. 20A, 20C and 20G, each of these patterns being one in which black dots are arranged along a single step height.

FIGS. 21A through 21G illustrate two similar types of patterns for approximately vertical lines.

The embodiments of the present invention previously stores the above patterns shown in FIGS. 19A through 21G to be used to examine whether these stored patterns match a pattern appearing in a core area 73C of actual input image data. Thus, the relevant pattern of the input image data can be easily classified into one which should not be corrected in the embodiments, one which is a candidate of an approximately horizontal line or one which is a candidate of an approximately vertical line.

Peripheral areas will now be described. Peripheral areas such as mentioned above are used to determine that candidates of approximately horizontal or vertical lines such as mentioned above are real approximately horizontal or vertical lines which should be corrected in the embodiments. As described above with reference to FIGS. 22A through 22D, the peripheral areas 73R, 73L, 73U and 73D located right, left, top and bottom of the core area 73C are used. As shown in the figures, each of these four peripheral areas 73R, 73L, 73U and 73D has two dots located at two ends thereof, at which dots two adjacent areas overlap with one another.

As shown in FIGS. 23A, 23B, 23C, 24A, 24B and 24C, each of the four peripheral areas is further separated into three sub-areas. However, each of these sub-areas overlaps with the adjacent sub-area(s) as shown in the figures. Thus, the right area 73R and left area 73L are separated into right sub-areas 73Ra, 73Rb and 73Rc and left sub-areas 73La, 73Lb and 73Lc. The upper area 73U and lower area 73D are separated into the upper sub-areas 73Ua, 73Ub and 73Uc and lower sub-area 73Da, 73Db and 73Dc. Such sub-separating of the peripheral areas is performed so as to simplify the circuit formation required to achieve the pattern matching operation using the thus sub-separated peripheral areas. The embodiments selects appropriate sub-areas from among the above mentioned sub-areas depending on the line pattern, present between a black-dot region and a white-dot region, detected in the core area 73C to which the sub-areas are adjacent.

Figure 22A:
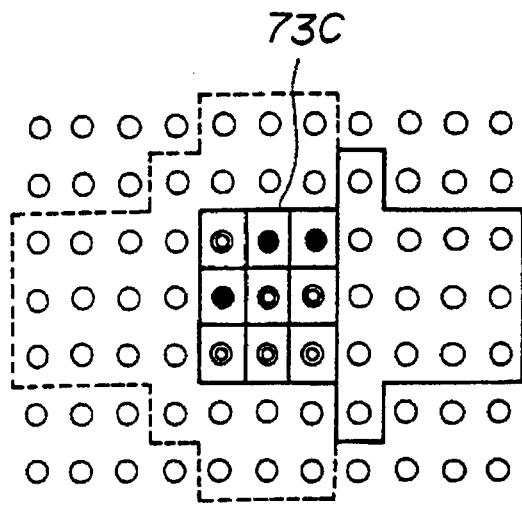
FIGS. 22A, 22B, 22C and 22D illustrate a right area, a left area, an upper area and a lower area acting as peripheral areas for a core area 73C in a window 73 shown in FIG. 8.
Figure 22B:
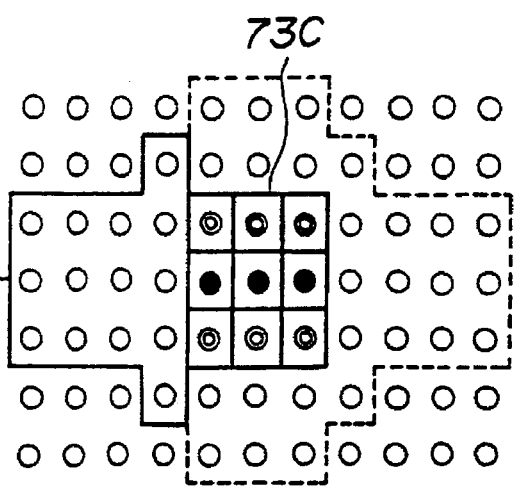
Figure 22C:
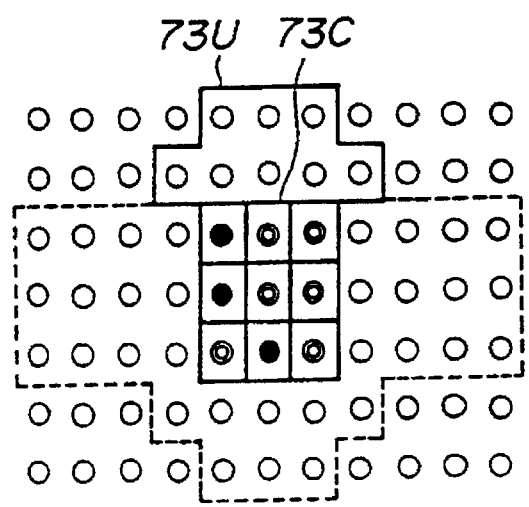
Figure 22D:
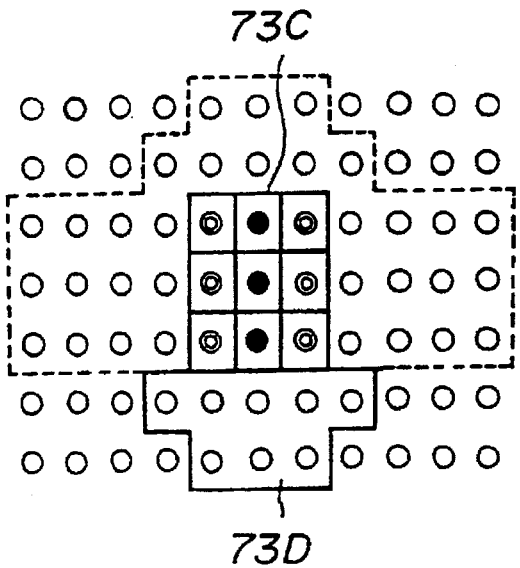
Figure 23A:
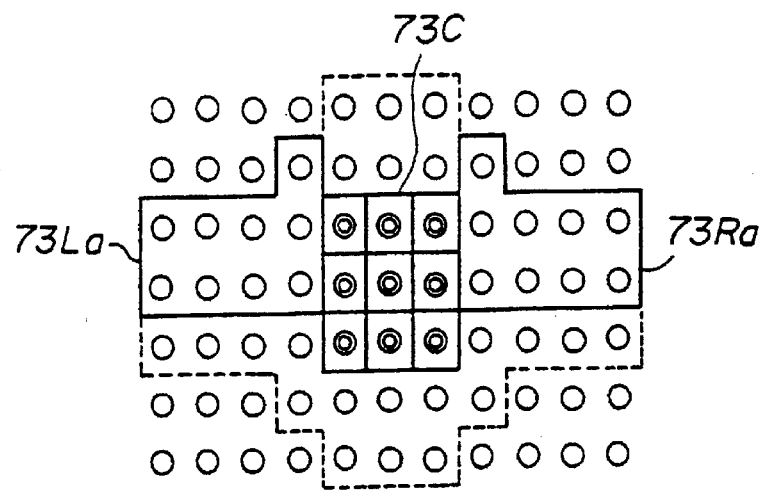
FIGS. 23A, 23B and 23C illustrate three sub-areas for the above right area 73R and left area 73L.
Figure 23B:
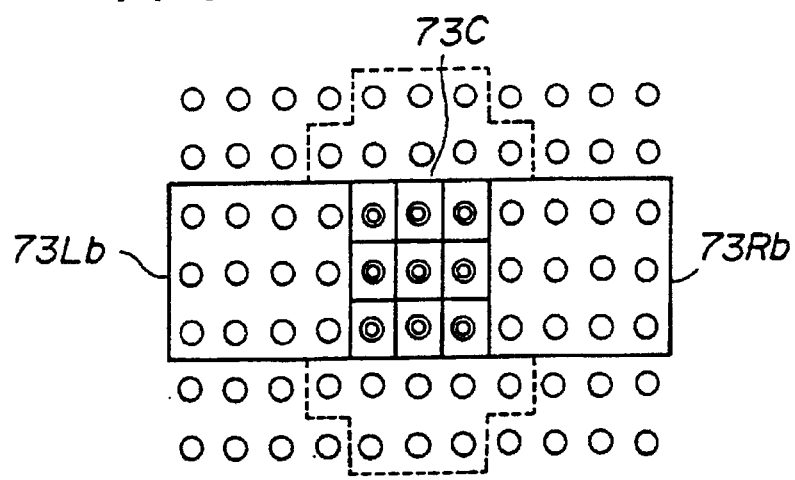
Figure 23C:
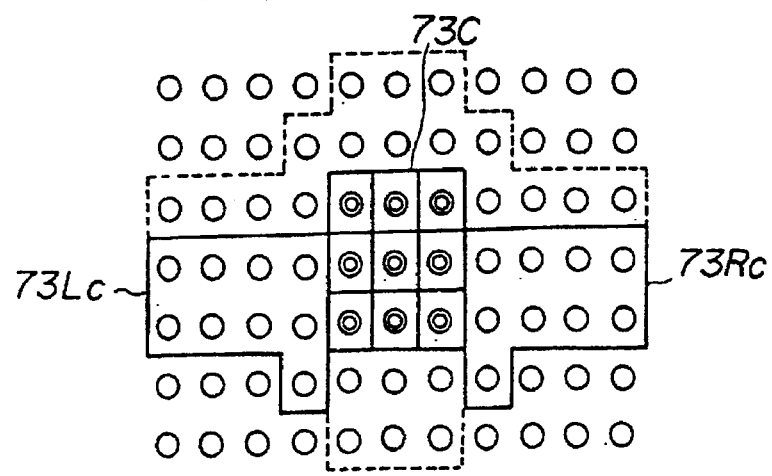
Figure 24A:
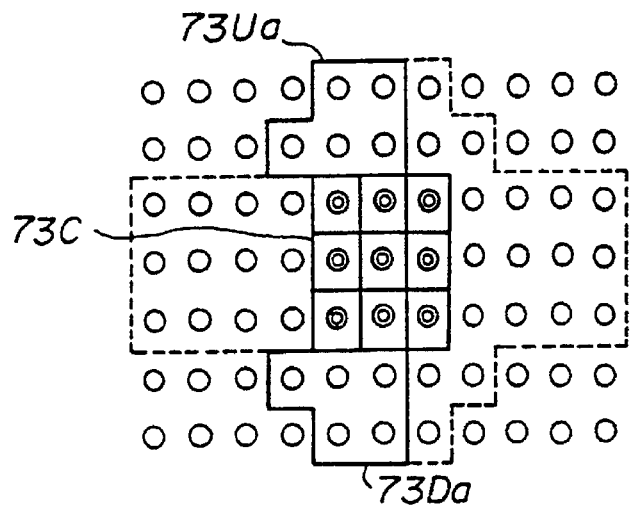
FIGS. 24A, 24B and 24C illustrate three sub-areas for the above upper area 73U and lower area 73D.
Figure 24B:
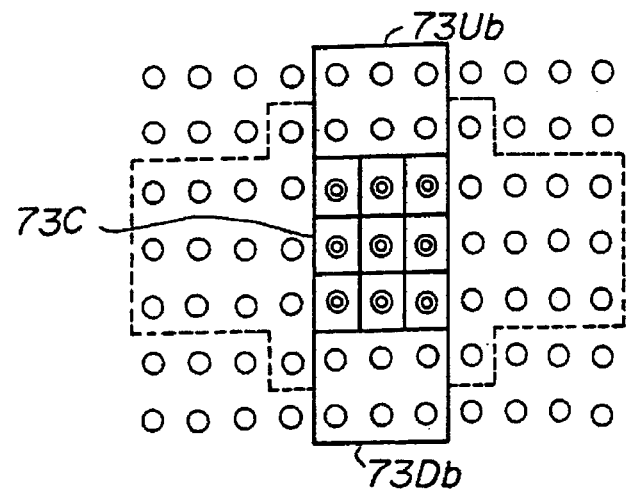
Figure 24C:
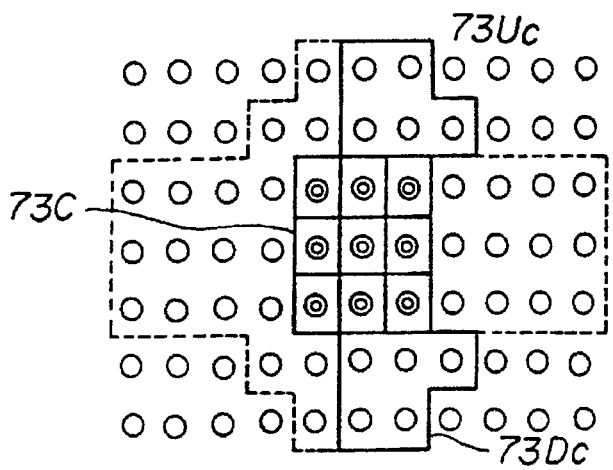

That is, if the detected line pattern in the core area 73C corresponds to the line having the gradient equal to or less than the ½ slope, that is, approximately horizontal, the right or left area 73L or 73R shown in FIGS. 22A and 22B, or both areas, are then examined. Similarly, if the detected line pattern in the core area 73C corresponds to the line having the gradient equal to or more than the ⅔ slope, that is, approximately vertical, the upper or lower areas 73U or 73D shown in FIGS. 22C and 22D, or both areas, are then examined. Further, in such an examination, depending on the position of the detected line in the core area 73C, an appropriate sub-area in the above area is selected so as to improve the efficiency in the operation by which it is determined whether or not the relevant line corresponds to a line to be corrected in the embodiment of the present invention. For an example shown in FIG. 25, the left sub-area 73Lb and right sub-area 73Ra are examined and for an example shown in FIG. 26, the upper sub-area 73Ub and lower sub-area 73Dc are examined. Alternatively, another sub-area selection is also possible in which only the right sub-area 73Ra is examined for the FIG. 25 example and only the upper sub-area 73Ub is examined for the FIG. 26 example.

Figure 25:
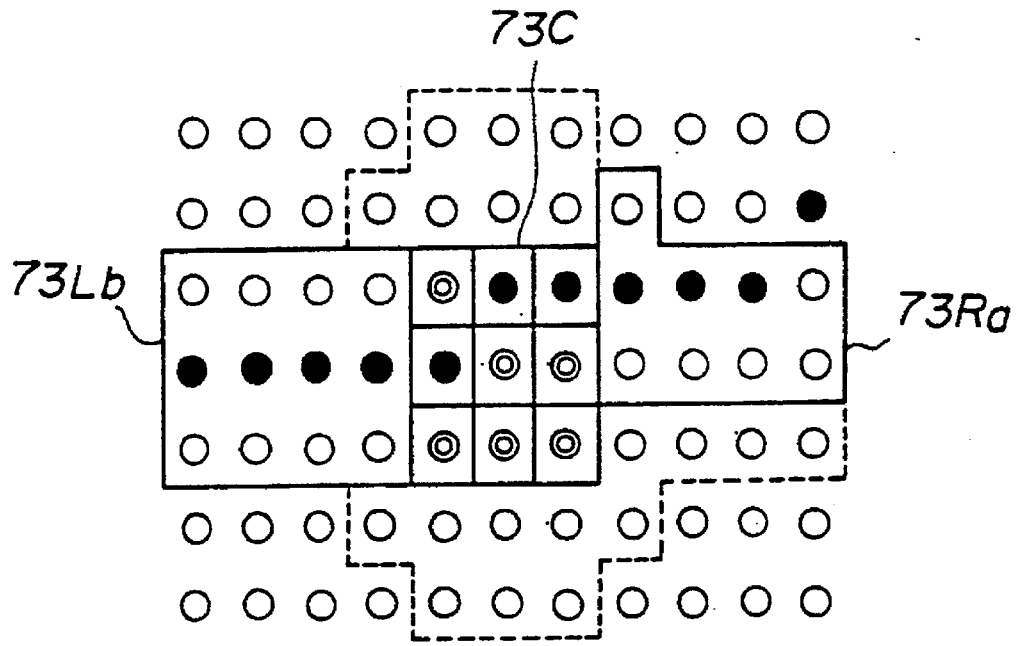
FIGS. 25 and 26 illustrate examples in which sub-areas are selected as a result of an approximately horizontal line pattern and an approximately vertical line pattern being recognized.
Figure 26:
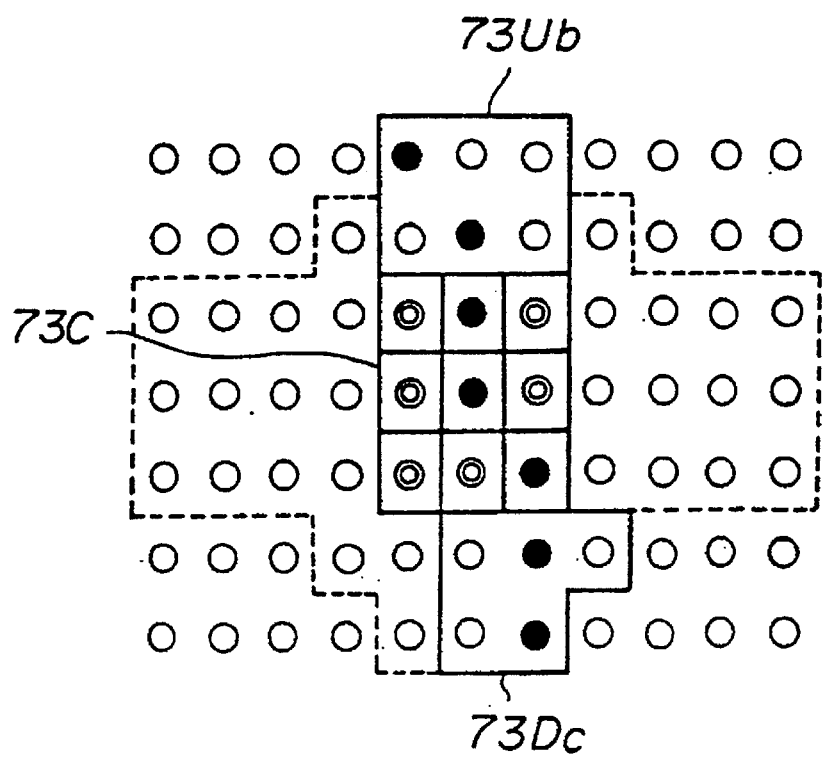

The selection method will now be described. The selection is based on an assumption that each line such as that represented by the serial black-painted circles in the FIGS. 25 or 26 represents a straight line having a constant gradient. In the FIG. 25 example, inside the core area 73C, a level difference (step) of the line is present at the left side of the core area 73C as shown in the figure. According to the above assumption, it can be said that a level difference present in each side of the line outside the core area 73C is located at a position away from the position of the level difference inside the core area 73C by the same distance. Therefore, because the position of the level difference inside the core area 73C is located at the left side as mentioned above, a distance between the right-side level difference present outside the core area 73C and the core area 73C right edge is shorter than a distance between the position of the left-side level difference present outside the core area 73C and the core area 73C left edge.

With reference to FIG. 9, the respective output signals of the blocks included in the pattern recognizing unit 74 will now be described.

Signals supplied by the core-area recognizing unit 741 will now be described. An H/V signal indicates whether the relevant pattern corresponds to an approximately horizontal or vertical line. The level of the signal is the high "1" if the line is approximately horizontal and is low "0" if the line is approximately vertical.

Signals DIR0 and DIR1 indicate a two-bit code as follows:

If both DIR1 and DIR0 are at "0", the signal indicates no match state (that is, the relevant line should not be corrected);

if DIR1 is at "0" and DIR0 is at "1", the signal indicates that the relevant line has a gradient such that the right side is located higher and the left side is located lower;

if DIR1 is at "1" and DIR0 is at "0", the signal indicates that the relevant line has a gradient such that the left side is located higher and the right side is located lower; and if the two are at "1", the signal indicates that the relevant line is the horizontal or vertical one.

A B/W signal indicates whether the relevant dot is a black or a white dot, that is, the content of the relevant dot itself. If the relevant dot is a black one, the signal is at "1" and is at "0" if the relevant dot is the white one.

A U/L signal indicates that, if the relevant dot is a white one, the relevant dot is located higher (rightward) or lower (leftward) than the line (a boundary line present between black and white regions). The signal is at "1" if the dot is located upper (righter) and the signal is at "0" if the dot is located lower (leftward).

A GST signal indicates whether the relevant dot is one which corresponds to a starting point on the line, from which point the gradient of the line is calculated. The starting point corresponds to a dot which forms a jag on the line, that is, corresponds to a dot by which the line rises/decays stepwise. The signal is at "1" when the dot corresponds to the starting point.

An RUC signal indicates whether the right area 73R or upper area 73U should be examined. If it should be examined, the signal is at "1".

An LLC signal indicates whether the left area 73L or lower area 73D should be examined. If it should be examined, the signal is at "1".

The state where both the RUC signal and the LLC signal are at "1" indicates that the relevant line is horizontal or vertical. The state where both the RUC signal and the LLC signal are at "0" indicates that a pattern matching operation is not required for the relevant line.

CC0 and CC1 signals are two-bit information indicating a number, one of 1 through 3, of serial dots corresponding to the line pattern present within the core area 73C.

RUAS0 and RUAS1 signals are two-bit information for specifying one of the three sub-areas in the right area 73R or the upper area 73U.

LLAS0 and LLAS1 signals are two-bit information specifying one of the three sub-areas in the left area 73L or the lower area 73D.

Signals output from the peripheral area recognizing unit 742 will now be described.

'cn0 through cn2' signals are 3-bit information indicating the number, one of 0 through 4, of horizontally or vertically serial dots present in the peripheral areas, which dots are subsequent to the specific dots present in the core area 73C.

'dir0 and dir1' signals are 2-bit information indicating the gradient direction of the line pattern detected as a result of the pattern matching detection operation performed on the sub-areas. The coding manner is the similar to that of the above-described DIR0 and DIR1 signals.

Signals output from the multiplexers (MUX) 743 and 744 will now be described.

RUCN0 through RUCN2 signals are 3-bit information indicating the number of serial dots present in the right area 73R or the upper area 73U.

RUDIR0 and RUDIR1 signals are 3-bit code information indicating the gradient direction of the line present in the right area 73R or the upper area U.

LLCN0 through LLCN2 signals are 3-bit information indicating the number of serial dots present in the left area 73L or the lower area 73D.

LLDIR0 and LLDIR1 signals are 3-bit code information indicating the gradient direction of the line present in the left area 73L or the lower area 73D.

Signals output from the determining unit 747 will now be described.

DIR0 and DIR1 signals are the same as those output from the core-area recognizing unit 741 as described above.

A NO-MATCH signal indicates, by being at "1", that no pattern which should be corrected in the embodiments is present in the currently recognized line.

Signals supplied by the gradient calculating unit 745 will now be described.

G0 through G3 signals are 4-bit information indicating the gradient of the currently recognized line. However, this gradient is not the mathematical gradient but is expressed by the number of the horizontally serial dots or the number of the vertically serial dots. That is, the number of serial dots present before the line one-dot-stepwise rises/decays corresponds to the above gradient.

Signals output by the position calculating unit 746 will now be described.

'p0 through p3' signals are 4-bit code information indicating the position of the relevant dot. The signals indicate the number of dots starting from the left-end dot and ending at the relevant dot within the serial dots if the line is an approximately horizontal line and indicating the number of dots starting from the bottom-end dot and ending at the relevant dot within the serial dots if the line is an approximately vertical line.

Signals output from the gate 748 will now be described.

P0 through P3 signals indicate position code information and are the above signals 'p0 through p3' supplied by the position calculating unit 746 if the NO-MATCH signal supplied by the determining unit 747 is at "0". If the NO-MATCH signal is at "1", the P0 through P3 signals indicate "0".

Operations performed by the respective blocks of the pattern recognizing unit 74 shown in FIG. 9 will be simply described.

The core-area recognizing unit 741 extracts the data of the dots included in the core area 73C of the window 73 and performs various checking and calculations for the relevant dot. Thus, the unit 741 supplies the above-described H/V, B/W and U/L signals to the memory block 75 and changes the input of the multiplexers 743 and 744 using the signal H/V indicating whether the line is approximately horizontal or approximately vertical.

The unit 741 further supplies the RUC and LLC signals, indicating which peripheral area should be examined, to the calculating unit 745 and the determining unit 747. The unit 741 further supplies the GST signals, indicating whether or not the relevant dot is one at which the line rises/decays stepwise, to the position calculating unit 746. Further, unit 741 supplies the line-gradient direction code information DIR0 and DIR1 to the determining unit 747.

Further, the unit 741 supplies CC0 and CC0 signals to the calculating unit 745, supplies the RUAS0 and RUAS1 to the upper-area recognizing unit 742U and the right-area recognizing unit 742R of the peripheral-area recognizing unit 742 and supplies the LLAS0 and LLAS1 to the lower-area recognizing unit 742D and the left-area recognizing unit 742L of the peripheral-area recognizing unit 742. The thus-supplied signals select appropriate sub-areas among the three sub-areas of the respective areas.

The upper-area recognizing unit 742U, right-area recognizing unit 742R, lower-area recognizing unit 742L and left-area recognizing unit 742L of the peripheral-area recognizing unit 742 appropriately extract the data of the dots present within the thus-selected sub-areas of the upper area 73U, right area 73R, lower area 73D and left area 73L of the window 73. Thus, the unit 742 recognizes the relevant line patterns so as to supply, to the multiplexer 743 or 744, the 'cn0 through cn2', 'dir0 and dirl' signals indicating the number of serial dots and the gradient direction of the line present within the relevant sub-areas.

The multiplexer 743 selects to input thereto the signal supplied by the upper-area recognizing unit 742U if the above signal H/V is at "0" and selects the signal supplied by the right-area recognizing unit 742R if the above signal H/V is at "1". The multiplexer 743 thus supplies the thus-input signals indicating the number of serial dots within the relevant sub-area to the gradient calculating unit 745 as the signals RUCN0 through RUCN2. The multiplexer 743 supplies the thus-input signals indicating the gradient direction of the line within the relevant sub-area to the determining unit 747 as the signals RUDIR0 and RUDIR1.

Similarly, the multiplexer 744 selects to input thereto the signal supplied by the lower-area recognizing unit 742D if the signal H/V is at "0" and selects the signal supplied by the left-area recognizing unit 742L if the signal H/V is at "1". The multiplexer 744 thus supplies the thus-input signals indicating the number of serial dots within the relevant sub-area to the gradient calculating unit 745 and the position calculating unit 746 as the signals LLCN0 through LLCN2. The multiplexer 744 supplies the thus-input signals indicating the gradient direction of the line within the relevant sub-area to the determining unit 747 as the signals LLDIR0 and LLDIR1.

The determining unit 747 determines, using the thus-supplied code information DIR0 and DIR1, RUDIR0 and RUDIR1, LLDIR0 and LLDIR1, whether or not the relevant line should be corrected in the jag-correction operation. If the unit 747 determines to correct the line, the unit 747 supplies the above DIR0 and DIR1 and sets "0" on the signal NO-MATCH. If "1" is set on the signal NO-MATCH, this signal closes the gate 748 so as to prevent significant position information P0 through P3 from being supplied.

The gradient calculating unit 745 calculates the gradient (GRADIENT) of the currently recognized line pattern as the number of serial dots as described above and supplies the corresponding code information G0 through G3. This calculation uses the supplied code information CC0 and CC1, RUCN0 through RUCN2, LLCN0 through LLCN2, and signals RUC and LLC.

The position calculating unit 746, using the supplied code information LLCN0 through LLCN2 and the signal GST, calculates the position (POSITION) of the relevant dot and supplies the corresponding code information p0 through p3 (=P0 through P3).

Methods of calculating of gradients (GRADIENTS) through the gradient calculating unit 745 and calculating of positions (POSITIONS) through the position calculating unit 746 will now be described.

The GRADIENTS and POSITIONS are calculated, using the above GST (the value (1-GST) is referred to as 'notGST', hereinafter), CC0 and CC1 (referred to CC, hereinafter), RUC and LLC supplied by the corearea recognizing unit 741 and the above RUCN0 through RUCN2 (referred to as RUCN, hereinafter), and LLCN0 through LLCN2 (referred to as LLCN, hereinafter), through the following equations (1) and (2):

$$GRADIENT = CC + RUC \cdot RUCN + LLC \cdot LLCN \quad (1)$$

$$POSITION = GST + notGST \cdot (LLCN + 2) \quad (2)$$

Concrete calculation examples will now be described for dot-represented line patterns examples shown in FIGS. 27 through 29. In each example, a relevant dot is one located at the d-th line and sixth row in the 7×11 matrix of dots.

The FIG. 27 example will now be described.

The relevant dot is not the dot at which the line (represented by the black-painted circles) rises/decays stepwise. Within the core area 73C, the number of serial dots is 3 and in this case, it is necessary to examine the two-side peripheral areas, which are the right area 73R and left area 73L. This is because there is no difference in level present on the line within the core area 73C. If there is a difference in level within the core area 73C, as shown in FIG. 25, it is possible to omit to examine a peripheral area on one side for the reason described above with reference to FIG. 25. Thus, the core-area recognizing unit 741 supplies GST=0, CC=3, RUC=1 and LLC=1.

With regard to the above peripheral areas 73R and 73L, the number of serial dots subsequent to the relevant dot-made line within the core area 73C present, before a level difference appears on the line, is 1 in each area as shown in the figure. Thus, the MUX 743 and 744 supply RUCN=1 and LLCN=1.

Thus, by substituting the above actual values for the respective terms of the above equations (1) and (2);

$$GRADIENT = 3 + 1 \cdot 1 + 1 \cdot 1 = 3 + 1 + 1 = 5$$

and $$POSITION = 0 + (1-0) \cdot (1+2) = 0 + 1 \cdot 3 = 3$$

The FIG. 28 example will now be described.

Figure 27:
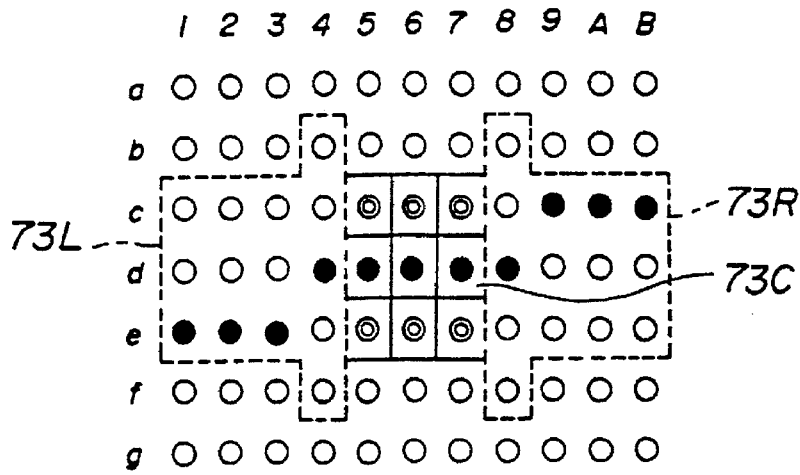
FIGS. 27, 28 and 29 illustrate examples of line patterns: a pattern; another pattern resulting from each bit being shifted one-bit rightward; and another pattern resulting from each bit being further shifted one-bit rightward, present in the window 73 for illustrating calculation examples of gradients and positions by means of a gradient calculating unit 745 and a position calculating unit 746 shown in FIG. 9.
Figure 28:
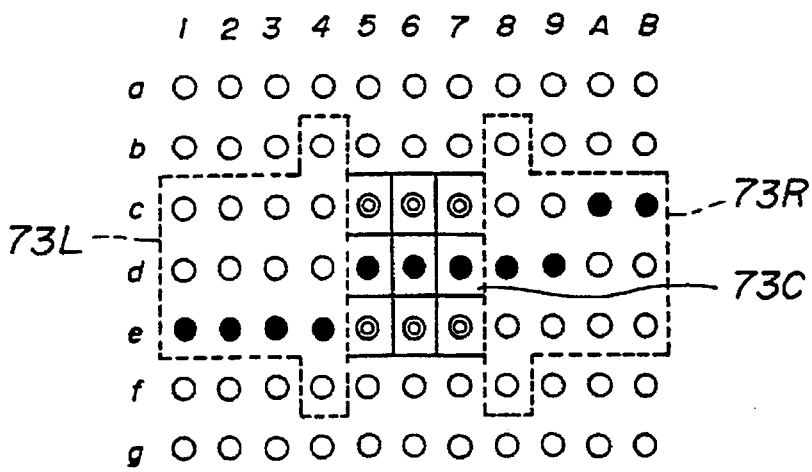

The FIG. 28 example includes a line pattern obtained by shifting each bit in the FIG. 27 example rightward by one bit. As a result, the number of serial dots, present in the peripheral area 73R, subsequent to the relevant dot-made line present in the core area 73C is 2 and that present in the peripheral area 73L is 0. Thus, RUCN=2 and LLCN=0 accordingly. The other situation and, thus, the resulting values are the same as those of the FIG. 27 example.

Thus, by substituting the relevant actual values for the respective terms of the above equations (1) and (2);

$$GRADIENT = 3 + 1 \cdot 2 + 1 \cdot 0 = 3 + 2 + 0 = 5$$

and $$POSITION = 0 + (1-0) \cdot (0+2) = 0 + 1 \cdot 2 = 2$$

The FIG. 29 example will now be described.

Figure 29:
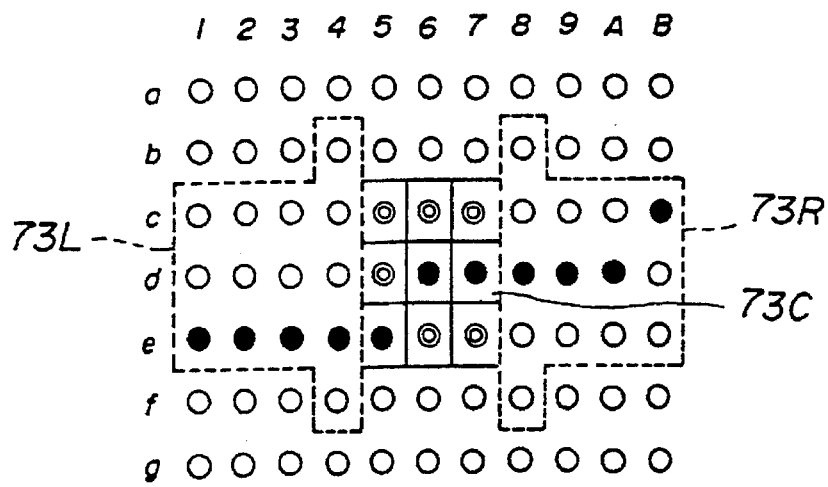

The FIG. 29 example includes a line pattern obtained by further shifting each bit in the FIG. 28 example rightward by one bit. The relevant dot is the dot at which the line rises/delays stepwise, that is, the level difference is present in the core area 73C. Within the core area 73C, the number of serial dots is 2 and in this case, it is necessary to examine only the right peripheral area 73L for the reason described above with reference to FIG. 25. Thus, the core-area recognizing unit 741 supplies GST=1, CC=2, RUC=1 and LLC=0.

The number of serial dots present subsequent to the relevant dot-made line within the core area 73C, before a level difference appears on the line, is for the right area 73R and is 4 for the left area 73L, as shown in the figure. Thus, the MUX 743 and 744 supply RUCN=3 and LLCN=4.

Thus, by substituting the above actual values for the respective terms of the above equations (1) and (2);

$$GRADIENT = 2 + 1 \cdot 3 + 0 \cdot 4 = 2 + 3 + 0 = 5$$

and $$POSITION = 1 + (1-1) \cdot (4+2) = 1 + 0 - 6 = 1$$

Thus, the example of calculations for cases of approximately horizontal line patterns have been described. For cases of approximately vertical line patterns, the above equations (1) and (2) are used so as to obtain corresponding GRADIENTS and POSITIONS, similarly to the above-described cases of the approximately horizontal line patterns. However, in each case of the cases of approximately vertical line patterns, the number of serial dots, present in the upper peripheral area 73U, subsequent to the relevant dot-made line present in the core area 73C is substituted for the term RUCN and that present in the lower peripheral area 73D is substituted for the term LLCN.

Methods for performing the jag-correction operation will now be described.

The jag-correction operation to be performed on an approximately horizontal line will now be described with reference to FIGS. 25, 30A, 30B, 32A, 32B, 32C and 32D.

Figures 30A, 30B:
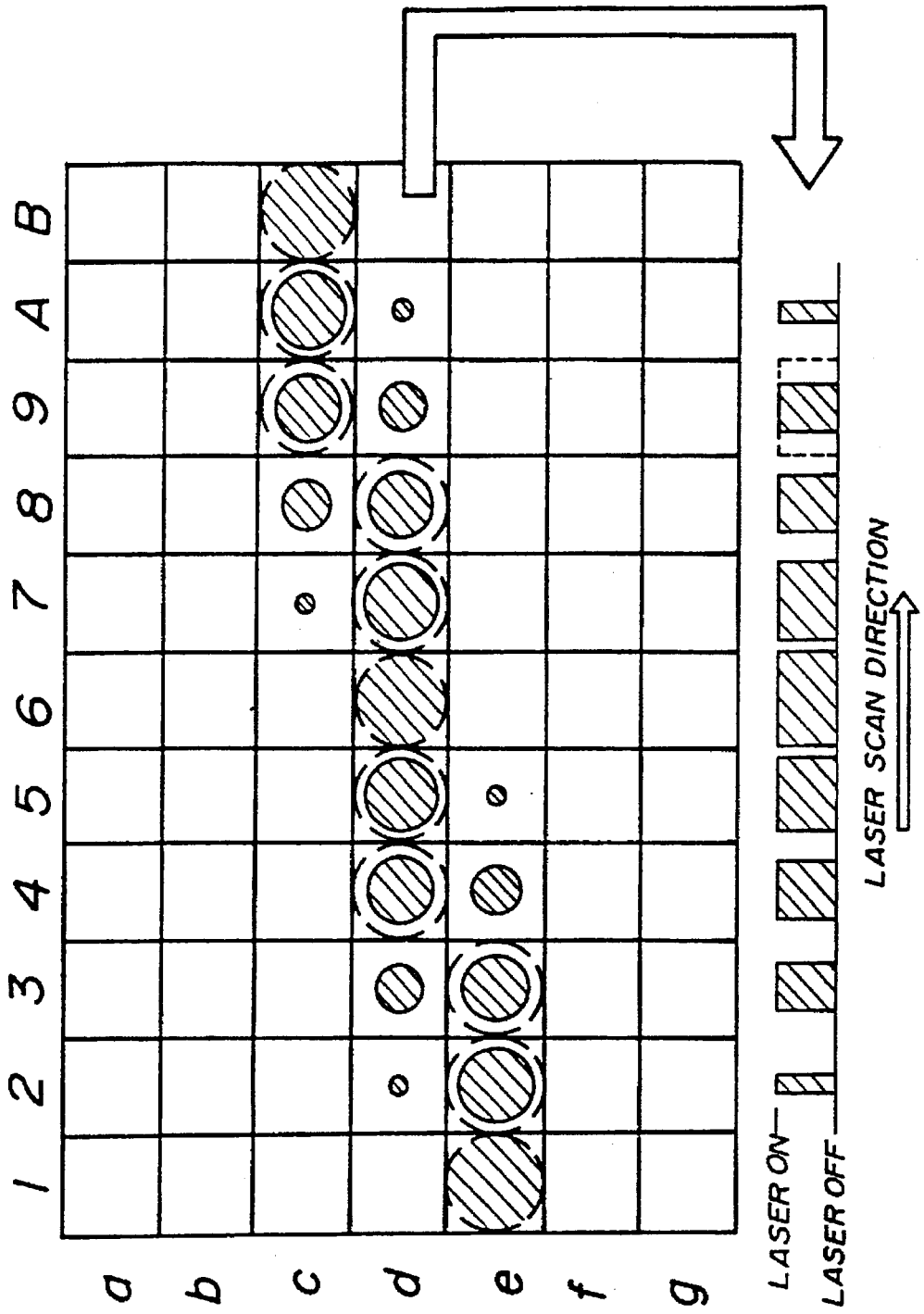
FIGS. 30A and 30B illustrate a dot correction example which the dot-correction unit 7 shown in FIG. 4 performs for an approximately horizontal line, and a corresponding laser pulse-width chart.

In FIG. 30A, dot information, in an example, according to the input video data supplied by the controller 3 is indicated by broken-line circles in a 7×11 matrix video area. The dot information according to the input video data indicates only black or white for each dot and does not indicate the size of the dot. Thus, it can be said that the size of each dot is fixed. In FIG. 30A, the circles painted by hatching indicates the dots obtained as a result of the jag-correction having been performed thereon. In the jag-correction operation, the dot diameters have been changed and new dots have been added as shown in FIG. 30A. The size/diameter of the dots correspond to the pulse widths causing the laser of the writing unit 26 shown in FIG. 1 to be ON, for example. The relevant line corresponding to the dot information according to the video data supplied by the controller 3 has the gradient of ⅕ slope, thus corresponding to an approximately horizontal line, as shown in the figure. Thus, in the 7×11 matrix area, two jags (level differences) are present, as each jag appears at five-dot intervals. FIG. 30B shows laser-ON pulse-width variation obtained by performing the jag-correction operation on the d-th line of the 7×11 matrix area.

The FIG. 25 example corresponds to one including the window 73 in the case where the dot located at the d-th line and 9th row in the 7×11 matrix shown in FIG. 30A. Columns headed by 'FIG. 25' in FIGS. 32A, 32B, 32C and 32D show the signals shown in FIG. 9 in the above case. FIG. 32A shows information indicated by the signals supplied by the core-area recognizing unit 741 and FIG. 32B shows information indicated by the signals supplied by the peripheral-area recognizing unit 742. FIG. 32C shows GRADIENT information indicated by the signals G0 through G3 and information indicated by the NO-MATCH signal. FIG. 32D shows POSITION information indicated by the signals P1 through P3.

Among the above signals, the H/V, DIR1, DIR0, B/W, U/L, G3 through G3, P3 through P3 are used as the address in the pattern memory 752 in the memory block 75 shown in FIG. 4. Thus, the correction data is read out from the pattern memory 752 according to the above address, the correction data being the corresponding video data. The video data is then sent to the engine driver 4 so as to drive the laser in the writing unit 26 shown in FIG. 1.

As a result, the laser-ON pulse width used in writing/printing the dot located at the d-th line and 9th row of the 7×11 matrix shown in FIG. 30A is reduced into 9/10 the full pulse-width preset for each dot as shown in FIG. 30B. Thus, the relevant dot is changed from the broken-line-drawn circle into the hatching-painted circle as shown in FIG. 30A. Thus, the dot diameter is reduced into 9/10 the full-size dot diameter. Each of the other dots becomes the relevant dot so that the corresponding signals are supplied to the pattern memory. Thus, by using the supplied signals as the addresses of the pattern memory, the corresponding video data as the correction data is supplied to the engine driver 4. Thus, the dots are appropriately corrected so that the dots indicated as the hatching-painted circles shown in FIG. 30A are obtained.

Thus, even if a relevant dot is a white dot according to video data supplied by the controller 3, a dot having the suitable diameter is produced if it is necessary for the relevant dot as a result of the line pattern present around the relevant dot having been recognized. In the embodiments of the present invention, such dot-diameter (laser-ON pulse-width) reduction is carried out such that a certain value is used as a unit to be used for the above reduction. The particular value is one obtained by dividing 1 by a particular integer. In the above example, the particular value is 1/10.

With reference to FIG. 30A, it seems that crevices are present between the adjacent lines of dots due to the dot-diameter reduction performed on the two ends of each line of dots. However, in an actual printing process through a laser printer, the printing resolution is not sufficiently fine so that blurs may appear. As a result, the adjacent lines of dots may be integrated into a single line through the printing process. Thus, the jags present in the dot information according to the video data supplied by the controller 3 are appropriately corrected so that the slightly-oblique smooth straight line is obtained.

The above FIG. 30A example is one for a line having width of a single dot, that is, a very thin line in an image. If it is assumed that a line to be processed/corrected is a boundary line present between a black painted (black-dot) region and a white (white-dot) region, the jag-correction operation is changed correspondingly as will be described. In other words, the above assumption is that there is a black-dot area having a width more than that of a single dot. In such an assumed case, if the jag-correction is performed, dot-diameter reduction and dot addition are performed on the end of the line of dots at which end the relevant line is located at an edge of the black-dot region. However, no dot-diameter reduction is performed on the end of the dot line, at which end the relevant dot line continues into the inside of the black-dot region. At the end of the dot line, the dot addition is not necessarily performed accordingly. These matters will now be described using the FIG. 30A example. It is assumed that all the region present below the dot lines present in the 7×11 matrix shown in the figure is the black-dot region. That is, it is assumed that the dot picture shown in FIG. 30A is one corresponding to a boundary line present between the upper white-dot region and the lower black-dot region, which line is the oblique straight line having the 1/5 slope. In this assumed case, the black dots located at the e-th line, second and third rows, the d-th line, 7th and 8th rows are left as the full-diameter dots without any dot-diameter reduction being performed. Further, no dot is added to the e-th line, 4th and 5th rows, the d-th line, 9th and A-th rows, as these positions have been already occupied by the full-size black dots under the above assumption.

The jag-correction operation to be performed on an approximately vertical line will now be described with reference to FIGS. 26, 31A, 31B, 32A, 32B, 32C and 32D.

Figures 31A, 31B:
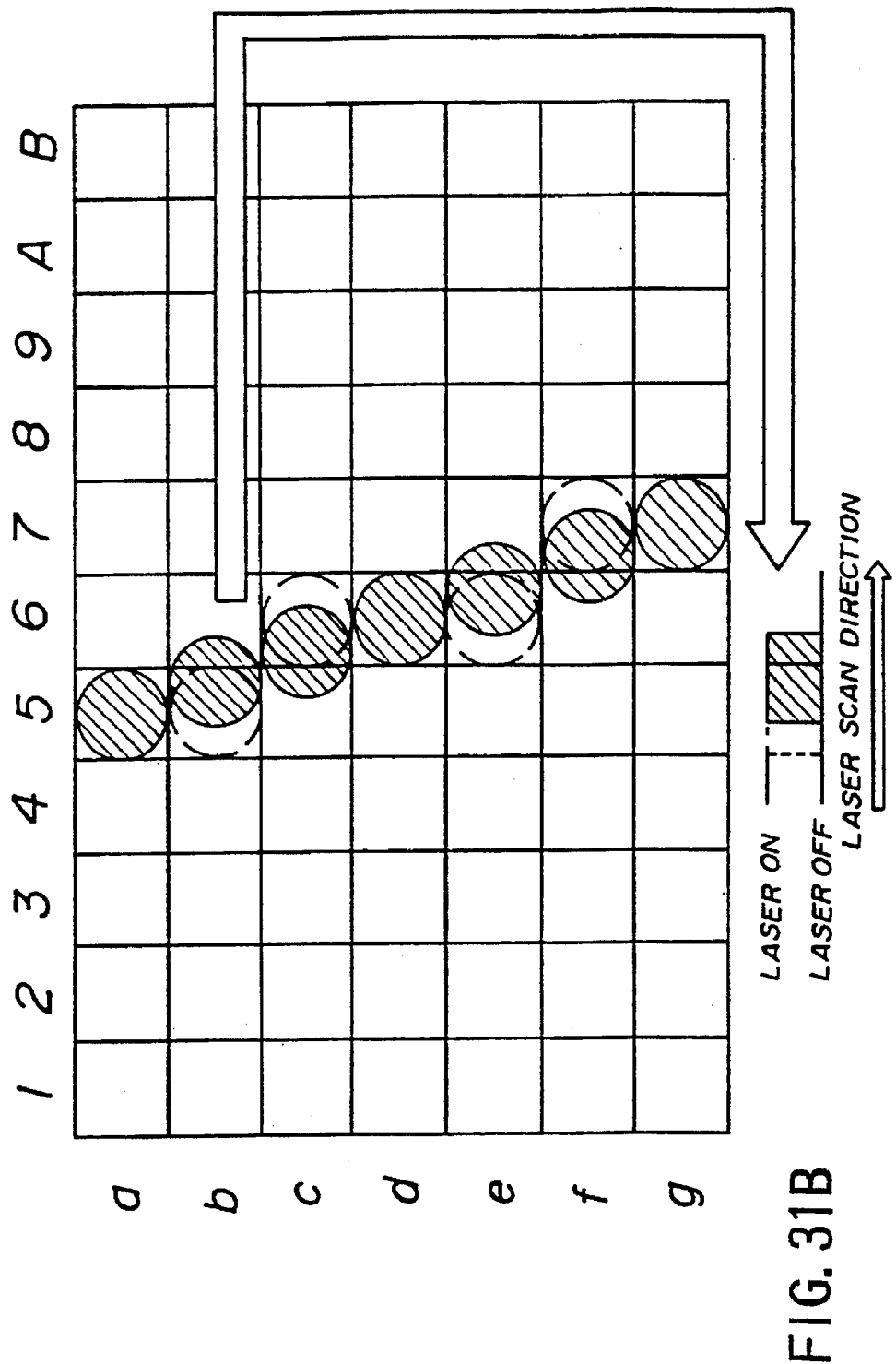
FIGS. 31A and 31B illustrate a dot correction example which the above dot-correction unit 7 performs for an approximately vertical line, and a corresponding laser pulse-phase chart.

In FIG. 31A, dot information, in an example, according to the input video data supplied by the controller 3 is indicated by broken-line circles in a 7×11 matrix video area. The dot information according to the input video data indicates only black or white for each dot and does not indicate the size of the dot, as described above. In FIG. 31A, the circles painted by hatching indicate the dots obtained as a result of the jag-correction having been performed thereon. In the jag-correction operation, the positions of the dots have been appropriately changed as shown in the figure. Such dot position change corresponds to the change in appearing time of pulses causing the laser of the writing unit 26 shown in FIG. 1 to be ON, for example. The relevant line corresponding to the dot information according to the video data supplied by the controller 3 has the gradient of 3/1 slope, thus corresponding to an approximately vertical line, as shown in the figure. Thus, in the 7×11 matrix area, two jags (differences in positions along the horizontal direction) are present, as each jag appears at three-dot intervals. FIG. 31B shows a laser-ON pulse-width time-shift obtained by performing the jag-correction operation on the b-th line of the 7×11 matrix area.

The FIG. 26 example corresponds to one including the window 73 in the case where the dot located at the b-th line and 5th row in the 7×11 matrix shown in FIG. 31A. The FIG. 26 columns in FIGS. 32A, 32B, 32C and 32D show the signals shown in FIG. 9 in the above case.

Among the above signals, the H/V, DIR1, DIR0, B/W, U/L, G3 through G0, P3 through P0 are used as the address in the pattern memory 752 in the memory block 75 shown in FIG. 4, as described above. Thus, the correction data is read out from the pattern memory 752 according to the above address, the correction data being the corresponding video data. The video data is then sent to the engine driver 4 so as to drive the laser in the writing unit 26 shown in FIG. 1.

As a result, the appearing time of the laser-ON pulse used in writing/printing the dot located at the b-th line and 5th row of the 7×11matrix shown in FIG. 31A is delayed by 1/3 the time period corresponding to the full pulse width without any variation occurring in the pulse width, as shown in FIG. 31B. Thus, the position of the relevant dot is changed, rightward, from the position of the broken-line-drawn circle into the position of the hatching-painted circle by 1/3 the diameter of the dot, as shown in FIG. 31A. Each of the other dots becomes the relevant dot so that the corresponding signals are supplied to the pattern memory. Thus, by using the supplied signals as the addresses of the pattern memory, the corresponding video data as the correction data is supplied to the engine driver 4. Thus, the dot positions are appropriately changed horizontally so that the dots indicated as the hatching-painted circles shown in FIG. 31A are obtained. Thus, the jags present in the dot information according to the video data supplied by the controller 3 are appropriately corrected so that the slightly-oblique smooth straight line is obtained. Similarly to the above-described case, in the embodiments of the present invention, such dot position (laser-ON pulse appearing time) shift is carried out such that a certain value is used as a unit to be used for the above shift. The certain value is one obtained by dividing 1 by a certain integer. In the above example, the certain value is The above FIG. 31A example is one for a line having the width of a single dot, that is, a very thin line in an image. If it is assumed that a line to be processed/corrected is a boundary line present between a black painted (black-dot) region and a white (white-dot) region, the jag-correction operation is changed correspondingly as will be described. In other words, the above assumption is that there is a black-dot area having a width more than that of a single dot. In such an assumed case, if the dot position shift is required in the jag-correction operation such that a dot position is shifted from the black-dot region side to the white-dot region side by a certain distance, the dot is left unshifted and another dot, having the position shifted from the position of the original dot by the above certain distance, is added.

This matter will now be described using the FIG. 31A example. It is assumed that all the region present at the left side of the dot line present in the 7×11 matrix shown in the figure is the black-dot region. That is, it is assumed that the dot picture shown in FIG. 31A is one corresponding to a boundary line present between the right white-dot region and the left black-dot region, which line is the oblique straight line having 3/1 slope. In this assumed case, the black dots located at the b-th line, 5th row and the e-th line, 6th row are left unshifted at the positions indicated by the broken-line-drawn circles and other dots are added. The above other dots are indicated by the hatching-painted circles and have the positions shifted rightward (to the white-dot region side in the above assumption) from the position indicated by the broken-line-drawn circles. In this assumption, the black dots located at the c-th line, 6th row and f-th line, 7th row are shifted leftward (to the black-dot region side) by 1/3 the full-dot diameter from the broken-line-drawn circle positions to the hatching-painted circle positions. As a result, there are overlapping of two dots in the black-dot region. Such dot overlapping corresponds to two laser ON pulses overlapping to form a continuous double pulse.

Although the dot-correction unit 7 acting as the image processing system according to the present invention is provided in the internal interface 5 connecting the controller 3 with the engine driver 4 in the laser printer 2 in the above-described embodiments, it is also possible within the scope of the present invention to provide the dot-correction unit 7 in the controller 3 or in the engine driver 4.

Further, the present invention may be applied not only to such a laser printer but also to various image forming apparatuses and to image display/printing apparatuses for displaying/printing images formed by the above image forming apparatus. The above apparatuses are ones such as various optical printers such as an LED printer, a digital duplicator, a facsimile apparatus, and so forth. These apparatuses form images by expanding input video data into bit-map formation data and displaying/printing the thus-formed images.

Further, the present invention is not limited to the above-described embodiments, and variations and modifications may be made without departing from the scope of the present invention.

What is claimed is:

1. An image-data processing system comprising:

bit-map means for forming a bit map using given image data;

boundary recognizing means for recognizing characteristics of a boundary present between a first type of pixels and a second type of pixels constituting said bit map;

determining means for determining for each pixel whether a correction is necessary so as to significantly make an image produced from the given image data finer, the determination using at least part of the boundary characteristics;

correction means for performing a correction on image data for a pixel, the correction of said pixel having been determined to be necessary, said correction being performed in a manner determined depending on the relevant boundary characteristics;

image-region setting means for setting a plurality of image regions in said bit map, said correction means performing the correction in different manners between different image regions of said plurality of image regions; and data replicating means for replicating the given image data to produce copies of said image data in addition to an original of said given image data, said correction means performing the correction in different manners between said original and copies of said given image data.

2. The image-data processing system according to claim 1, further comprising numbering means for numbering an image data set created each time the replication means replicates the given image data so as to identify a number of each image data set created by the replication.

3. The image-data processing system according to claim 1, wherein:

said correction means uses a pattern memory previously storing therein a plurality of predetermined correction patterns to be used in the correction, said pattern memory being formed so that an appropriate manner of correction may be selected from among a plurality of predetermined manners of correction depending on three conditions, a first condition corresponding to which pattern said relevant boundary characteristics have, a second condition corresponding to which one of said original and copies of said given image data is relevant, and a third condition corresponding to which one of said plurality of image regions is relevant.

4. The image-data processing system according to claim 3, wherein:

said pattern memory includes a first memory and a second memory, said second memory previously storing therein said plurality of predetermined correction patterns, said second memory being formed so that a pattern may be selected from said plurality of predetermined correction patterns using a code selected from codes previously stored in said first memory, said first memory previously storing said codes therein, said first memory being formed so that the appropriate code may be selected from said codes depending on said three conditions.

5. The image-data processing system according to claim 3, wherein:

said pattern memory includes a first memory and a second memory, said second memory previously storing therein said plurality of predetermined correction patterns, said second memory being formed so that a pattern may be selected from said plurality of predetermined correction patterns using a code selected from codes previously stored in said first memory and codes indicating and said second and third conditions, said first memory previously storing said codes therein, said first memory being formed so that the appropriate code may be selected from said codes depending on the various patterns of the boundary characteristics.

6. The image-data processing system according to claim 1, further comprising changing means for changing a manner in which it is determined which one of said different manners of the correction performed by said correction means is performed on each one of said original and copies of said given image data.

7. The image-data processing system according to claim 1, further comprising:

clock generating means, inside said system, for generating internal clock pulses, and selecting means for selecting clock pulses, in synchronization with which pulses each means operates, from between said internal clock pulses and external clock pulses which may be supplied outside said system.

* * * * *